(12) United States Patent
Matsuda

(10) Patent No.: US 9,800,755 B2
(45) Date of Patent: Oct. 24, 2017

(54) PRINTER AND NON-TRANSITORY COMPUTER-READABLE RECORDING MEDIUM FOR PRINTING PAGE IMAGES REPRESENTING MULTIPLE PAGES REPRESENTED BY FILE STORED IN SERVER

(71) Applicant: BROTHER KOGYO KABUSHIKI KAISHA, Nagoya-shi, Aichi-ken (JP)

(72) Inventor: Munehisa Matsuda, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 15/280,330

(22) Filed: Sep. 29, 2016

(65) Prior Publication Data
US 2017/0187911 A1    Jun. 29, 2017

(30) Foreign Application Priority Data

Dec. 25, 2015   (JP) ................... 2015-253639

(51) Int. Cl.
| G06F 15/00 | (2006.01) |
| G06F 3/12 | (2006.01) |
| G06K 1/00 | (2006.01) |
| H04N 1/23 | (2006.01) |
| H04N 1/32 | (2006.01) |
| H04N 1/00 | (2006.01) |

(52) U.S. Cl.
CPC ......... H04N 1/2369 (2013.01); H04N 1/0097 (2013.01); H04N 1/00204 (2013.01); H04N 1/00344 (2013.01); H04N 1/00973 (2013.01); H04N 1/32459 (2013.01); H04N 2201/0039 (2013.01); H04N 2201/3232 (2013.01)

(58) Field of Classification Search
CPC ............ H04N 1/2369; H04N 1/00204; H04N 1/00344; H04N 1/0097; H04N 1/00973; H04N 1/32459; H04N 2201/0039; H04N 2201/3232
USPC ...................... 358/1.13, 1.1, 1.15, 1.14, 1.18
See application file for complete search history.

(56) References Cited

U.S. PATENT DOCUMENTS

| 2010/0097642 A1* | 4/2010 | Sumi | H04N 1/00244 |
| | | | 358/1.15 |
| 2010/0265542 A1* | 10/2010 | Horiyama | G06F 3/121 |
| | | | 358/1.15 |
| 2012/0120438 A1 | 5/2012 | Sato | |

(Continued)

FOREIGN PATENT DOCUMENTS

| JP | 2012-103966 A | 5/2012 |
| JP | 2013-114405 A | 6/2013 |
| JP | 2014-128899 A | 7/2014 |

*Primary Examiner* — Douglas Tran
(74) *Attorney, Agent, or Firm* — Scully, Scott, Murphy & Presser, P.C.

(57) ABSTRACT

A printer receives print setting information from a server, and executes a one-set process repeatedly in accordance with the print setting information. The one-set process includes: a specifying process for specifying a page number which is to be requested to the server, a transmitting process for transmitting the request including the specified page number to the server, a storing process for storing a partial data in the memory in a case where the partial data is received from the server, a printing process for printing using the partial data, and a releasing process for releasing an area in the memory.

24 Claims, 12 Drawing Sheets

(56) References Cited

U.S. PATENT DOCUMENTS

2014/0185087 A1 7/2014 Hayashi
2016/0253130 A1* 9/2016 Rajalingam ........... G06F 3/1205
358/1.15

* cited by examiner

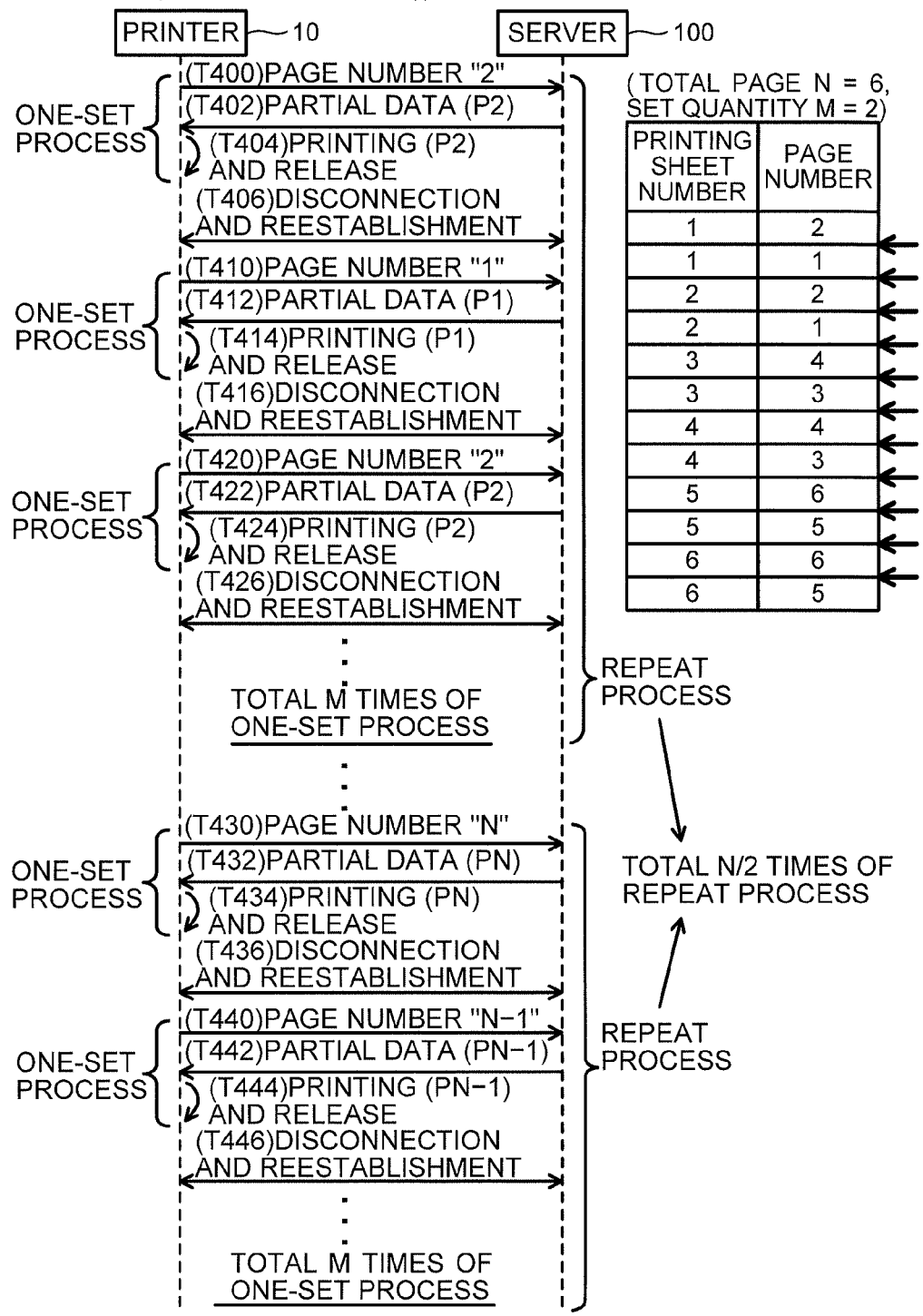

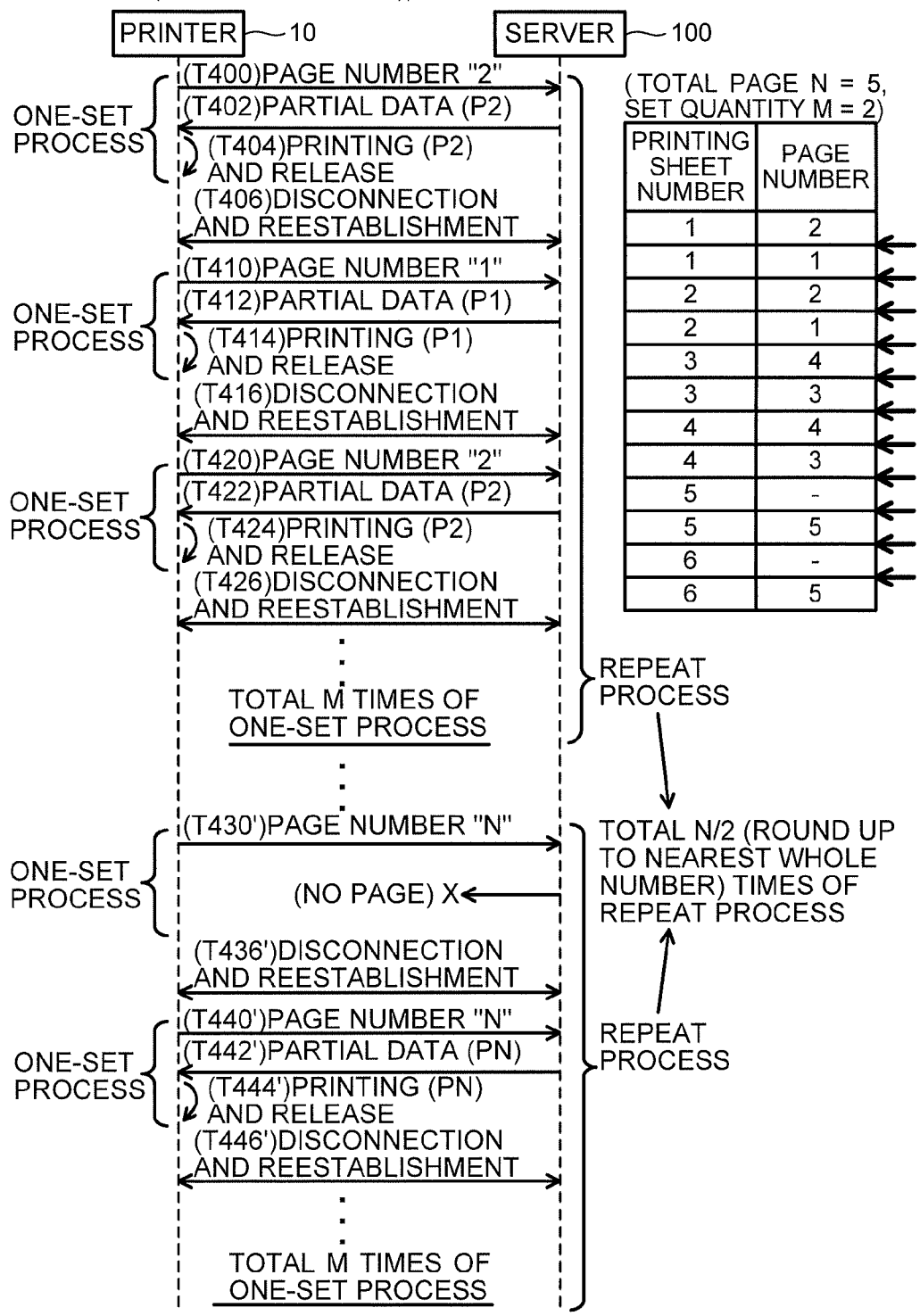

PRINTER AND NON-TRANSITORY COMPUTER-READABLE RECORDING MEDIUM FOR PRINTING PAGE IMAGES REPRESENTING MULTIPLE PAGES REPRESENTED BY FILE STORED IN SERVER

CROSS-REFERENCE TO RELATED APPLICATION

This application claims priority from Japanese Patent Application No. 2015-253639, filed on Dec. 25, 2015, which is incorporated herein by reference in its entirety.

TECHNICAL FIELD

The disclosure relates to a printer for printing page images representing multiple pages represented by a file stored in a server.

BACKGROUND

A known image forming apparatus performs printing by downloading a file stored in a server. The image forming apparatus accepts a print request provided by a user via an operation panel. The print request includes print settings specifying, for example, a page range to be printed. The image forming apparatus requests the server to download data in accordance with the print settings to the image forming apparatus, and performs printing in accordance with the print settings.

SUMMARY

Some embodiments of the disclosure provide for a technique for enabling a printer to execute printing of images represented by a file stored in a server using a memory having a relatively small storage capacity in a state where print settings have been specified to the file stored in the server. That is, in some embodiments, consideration is given to minimization of a used space of a memory in a printer when the printer performs printing by receiving data from a server in a state where print settings have been specified to a file stored in the server.

One illustrative aspect of the disclosure may provide a printer comprising: a communication interface; a print engine; and a controller comprising: a processor; and a memory storing computer-readable instructions, the computer-readable instructions, when executed by the processor, causing the printer to perform: in a receiving process, receiving from a server, via the communication interface, print setting information, wherein the server stores therein a file representing page images representing N pages (N is an integer of 2 or larger) and the print setting information in association with each other, wherein the print setting information includes order information relating to a printing order of the page images; and in response to receipt of the print setting information from the server, in a repeat process, repeating a one-set process, the one-set process comprising: in a specifying process, specifying, in accordance with the order information, identification information that identifies partial data to be received from the server, wherein the partial data represents a partial image which is part of the page images representing N pages; in a transmitting process, transmitting a request including the specified identification information to the server via the communication interface; in response to receipt from the server via the communication interface of the partial data identified by the identification information included in the request, in a storing process, storing the partial data in the memory; in a printing process, causing the print engine to perform printing of the partial image represented by the partial data using the partial data stored in the memory; and subsequent to the printing process, in a releasing process, releasing in the memory a particular area storing the partial data.

According to one or more aspects of the disclosure, in response to receipt of print setting information from a server, a printer may repeat a one-set process in which a partial image which may be part of page images representing N pages may be printed in accordance with order information included in the print setting information. Therefore, this configuration may enable the printer not to store all partial data representing N pages at once at the time of printing the page images representing N pages. Consequently, under circumstances where the print setting information has been specified for the file stored in the server, the printer may perform printing of the page images representing N pages using a memory having a relatively small storage capacity.

Another illustrative aspect of the disclosure may provide a printer comprising: a communication interface; a print engine; and a controller comprising: a processor; and a memory storing computer-readable instructions, the computer-readable instructions, when executed by the processor, causing the printer to perform: in a receiving process, receiving from a server, via the communication interface, print setting information wherein the server stores therein a file representing page images representing N pages (N is an integer of 2 or larger) and the print setting information in association with each other; and in a first case in which the print setting information includes set quantity information indicating M sets, in a first repeat process, executing collated printing for a single set by repeating a first one-set process until all of the page images representing N pages is printed, the first one-set process comprising: in response to receipt from the server via the communication interface of partial data representing a partial image which is part of the page images representing N pages, in a storing process, storing the partial data in the memory; in a first printing process, causing the print engine to perform printing of the partial image represented by the partial data using the partial data stored in the memory; subsequent to the first printing process, in a first releasing process, releasing in the memory a particular area storing the partial data, in the first case, executing collated printing for the M sets by executing the first repeat process M times.

According to one or more aspects of the disclosure, the printer may repeat a one-set process in which a partial image which may be part of the page images representing N pages may be printed. Therefore, this configuration may enable the printer not to store all partial data representing N pages at once at the time of executing collated printing for M sets by printing page images representing N pages. Consequently, under circumstances where the print setting information has been specified for the file stored in the server, the printer may perform printing of the page images representing N pages using a memory having a relatively small storage capacity.

Control methods and computer programs for implementing the above-described printer, and computer-readable storage media storing the computer programs may be provided.

BRIEF DESCRIPTION OF THE DRAWINGS

Aspects of the disclosure are illustrated by way of example and not by limitation in the accompanying figures in which like reference characters indicate similar elements.

FIG. 11 illustrates a specific example of double-sided uncollated printing (even number of total pages) in the illustrative embodiment according to one or more aspects of the disclosure.

FIG. 12 illustrates a specific example of double-sided uncollated printing (odd number of total pages) in the illustrative embodiment according to one or more aspects of the disclosure.

DETAILED DESCRIPTION (Illustrative Embodiment)

Figure 1:
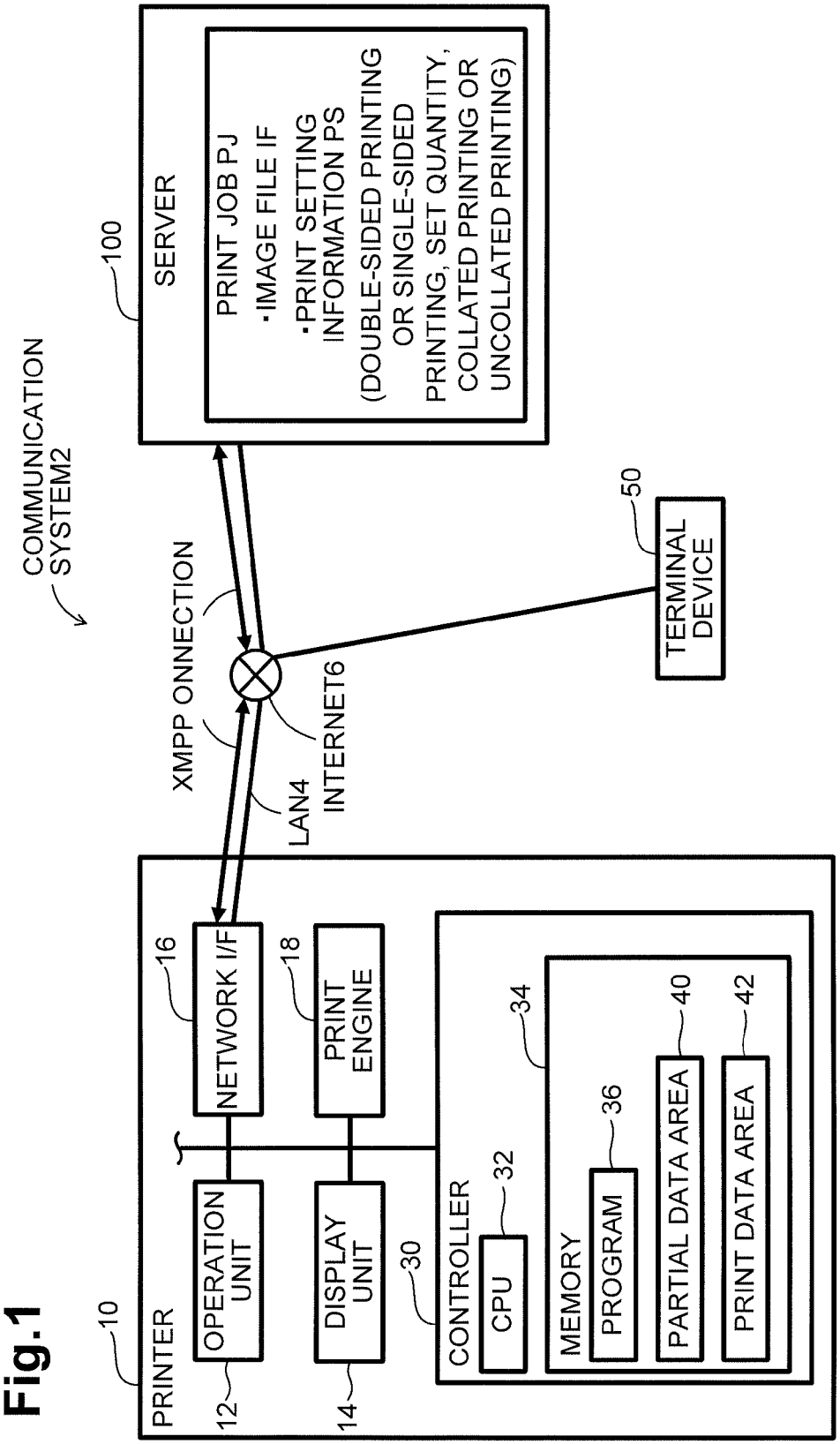
FIG. 1 depicts a configuration of a communication system in an illustrative embodiment according to one or more aspects of the disclosure.

An illustrative embodiment will be described in detail with reference to the accompanying drawings, like reference numerals being used for like corresponding parts in the various drawings.

As depicted in FIG. 1, a communication system 2 includes a printer 10, a terminal device 50, and a server 100. The printer 10 is connected to the Internet 6 via a local area network ("LAN") 4. The printer 10 and the server 100 are allowed to communicate with each other via the Internet 6. The terminal device 50 and the server 100 are allowed to communicate with each other via the Internet 6.

(Configuration of Printer 10)

The printer 10 may be a peripheral device capable of performing a printing function (i.e., a peripheral device for the terminal device 50). The printer 10 includes an operation unit 12, a display unit 14, a network interface ("I/F") 16, a print engine 18, and a controller 30, which are connected to a bus (for which a reference numeral is not assigned).

The operation unit 12 includes a plurality of keys and buttons. The operation unit 12 enables a user to provide various instructions to the printer 10 therethrough. The display unit 14 may be a display for displaying various information thereon. The display unit 14 also functions as a touch panel and thus operates as another operation unit. The network interface 16 is connected to the LAN 4. The LAN 4 may be a wired or wireless LAN.

The print engine 18 includes a printing mechanism using, for example, an inkjet printing method or a laser printing method. The print engine 18 further includes a double-sided printing mechanism for performing double-sided printing. The double-sided printing mechanism conveys a printing sheet to a particular position at which printing can be performed on a first side of the printing sheet, and performs printing on the printing sheet. In response to completion of the printing on the first side of the printing sheet, the double-sided printing mechanism further conveys the printing sheet to another particular position at which printing can be performed on a second side of the printing sheet. The second side is opposite to the first side. More specifically, for example, the print engine 18 might not print images representing multiple pages in ascending order of page numbers in double-sided printing. The print engine 18 prints an image representing the second page on a first side of the first printing sheet and then prints an image of the first page on a second side of the first printing sheet. Thereafter, the print engine 18 prints an image representing the fourth page on a first side of the second printing sheet and then prints an image representing the third page on a second side of the second printing sheet. As described above, the print engine 18 prints an image of the 2n-th page (n is an integer of 1 or larger) on a first side of a printing sheet and then prints an image of the (2n−1)th page on a second side of a printing sheet.

The controller 30 includes a central processing unit ("CPU") 32 and a memory 34. The CPU 32 may be a processor configured to execute various processes in accordance with a program 36 stored in the memory 34. The memory 34 includes a random access memory ("RAM"), a read-only memory ("ROM"), and a hard disk. The memory 34 includes a partial data area 40 and a print data area 42.

The partial data area 40 is for storing partial data received from the server 100. The server stores an image file IF. The image file IF includes multiple images representing multiple pages. The partial data represents part of the images of image file IF. In the illustrative embodiment, the partial data is in a PWG ("PWG" stands for Printer Working Group) raster format generated by the server 100 based on the image file IF by the server 100. Nevertheless, in other embodiments, for example, the partial data may be in another format, e.g., a PDF ("PDF" stands for Portable Document Format) format. The partial data area 40 has a storage capacity for partial data representing a single page but might not be capable of storing partial data representing two pages.

The print data area 42 is for storing print data generated by the printer 10 based on partial data. The print data may be in a format interpretable by the print engine 18. In the illustrative embodiment, the print data may be bitmap data having relatively less CMYK tones (e.g., two levels or three levels).

(Configuration of Server 100)

The server 100 is provided on the Internet 6 by a provider different from the vender of the printer 10. The server 100 may be, for example, Google Cloud Print ("GCP") (Google Cloud Print™ is a trademark owned by Google Inc. of Mountain View, Calif.) provided by Google (Google® is a registered trademark owned by Google Inc. of Mountain View, Calif.). Nevertheless, in other embodiments, for example, the server 100 may be provided by the vender of the printer 10.

The server 100 is configured to mediate printing between the terminal device 50 and the printer 10. That is, the server 100 converts an image file IF included in a print job PJ submitted from the terminal device 50 to generate converted data having a format interpretable by the printer 10 (e.g., PWG raster format), and transmits the converted data to the printer 10. Therefore, even if the terminal device 50 is not equipped with a printer driver for converting an image file IF, the terminal device 50 may cause the printer 10 to perform printing by submitting a print job PJ to the server 100.

(Outline of Printing)

A procedure in which the printer 10 performs printing in accordance with a print job PJ submitted to the server 100 from the terminal device 50 will be described briefly. First, the user of the printer 10 registers information regarding the printer 10 on the server 100 and establishes an XMPP ("XMPP" stands for Extensible Messaging and Presence Protocol) connection between the printer 10 and the server 100. Thus, an always-on connection is established between the printer 10 and the server 100. The always-on connection may enable transmission of a job notification from the server 100 on the Internet 6 to the printer 10 on the LAN 4.

In a case that the user of the terminal device 50 desires to cause the printer 10 to perform printing, the user accesses the server 100 to submit a print job PJ including an image file IF and print setting information PS to the server 100. The image file IF may be, for example, a file stored in a memory of the terminal device 50 and have, for example, JPEG ("JPEG" stands for Joint Photographic Experts Group) or PDF format. The print setting information PS may be information specified by the user and may include, for example, information indicating one of double-sided printing and single-sided printing, information indicating set quantity (hereinafter, referred to as "set quantity information"), and information indicating one of collated printing and uncollated printing. The collated printing may be synonymous with sorted printing. The uncollated printing may be synonymous with unsorted printing.

In response to acceptance of submission of the print job PJ, the server 100 transmits a job notification to the printer 10 through the XMPP connection. Thus, the printer 10 may be notified that the print job PJ has been stored in the server 100. The printer 10 receives each partial data generated based on the image file IF from the server 100 successively by requesting transmission of each partial data from the server 100. The printer 10 generates print data successively based on each received partial data and provides the generated print data to the print engine 18 successively. Thus, the printer 10 may perform printing in accordance with the print job PJ. The transmission of the request and the receipt of each partial data are executed in compliance with an HTTPS ("HTTPS" stands for Hyper Text Transfer Protocol Secure) but not an XMPP.

As described above, the partial data area 40 of the printer 10 has a relatively small storage capacity which is not capable of storing partial data representing two pages. In the illustrative embodiment, the printer 10 is capable of appropriately performing double-sided printing and collated printing using the partial data area 40 having a relatively small storage capacity. Assuming that an image file IF represents images representing multiple pages, processes for implementing double-sided printing and collated printing using the partial data area 40 having a relatively small storage capacity will be described below.

(Printing Process)

Figure 2:
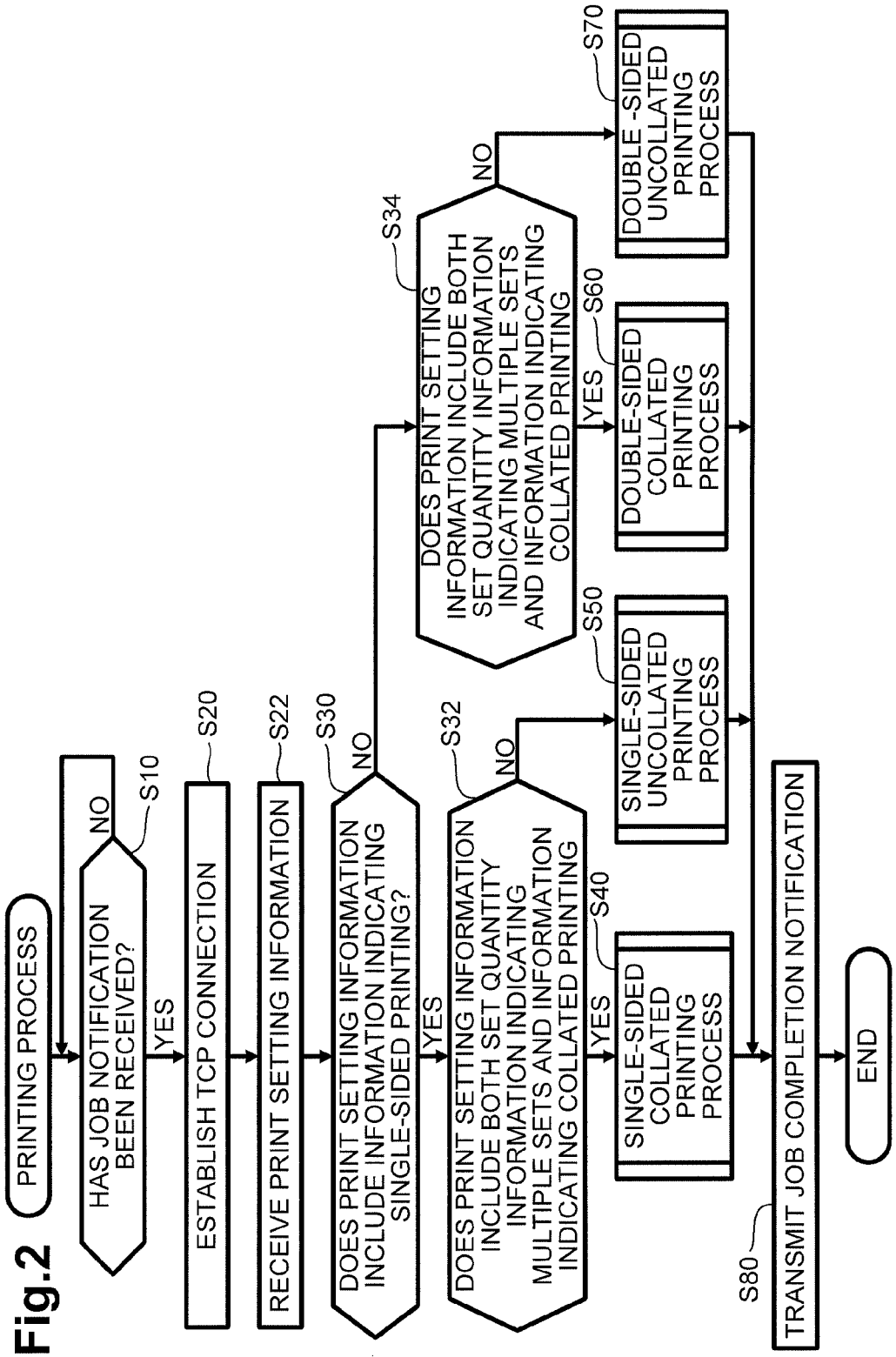
FIG. 2 is a flowchart depicting an example printing process in the illustrative embodiment according to one or more aspects of the disclosure.

Referring to FIG. 2, a printing process executed by the CPU 32 will be described. All processes relating to communications described below may be executed via the network interface 16, and therefore, the phrase "via the network interface 16" may be omitted.

In step S10, the CPU 32 monitors receipt of a job notification from the server 100 through the XMPP connection. In response to receipt of a job notification, the CPU 32 makes a positive determination (e.g., "YES") in step S10 and the routine proceeds to step S20.

In step S20, the CPU 32 transmits a connection signal for establishing a TCP ("TCP" stands for Transmission Control Protocol) connection to the server 100. In response to receipt of an OK signal from the server 100, the CPU 32 establishes a TCP connection between the printer 10 and the server 100. As a result, the CPU 32 is allowed to transmit a request to the server 100 and receive data from the server 100 through the TCP connection. In step S22, the CPU 32 receives print setting information PS included in the print job PJ from the server 100.

In step S30, the CPU 32 determines whether the print setting information PS includes information indicating single-sided printing. When the print setting information PS includes information indicating single-sided printing, the CPU 32 makes a positive determination (e.g., "YES") in step S30 and the routine proceeds to step S32. When the print setting information PS includes information indicating double-sided printing, the CPU 32 makes a negative determination (e.g., "NO") in step S30 and the routine proceeds to step S34.

In step S32, the CPU 32 determines whether the print setting information PS further includes both set quantity information indicating multiple sets and information indicating collated printing. When the print setting information PS includes both the information, the CPU 32 makes a positive determination (e.g., "YES") in step S32. Then, in step S40, the CPU 32 executes a single-sided collated printing process (refer to FIG. 3). When the print setting information PS includes at least one of set quantity information indicating a single set and information indicating uncollated printing, the CPU 32 makes a negative determination (e.g., "NO") in step S32. Then, in step S50, the CPU 32 executes a single-sided uncollated printing process (refer to FIG. 5).

Step S34 is similar to step S32. When the CPU 32 makes a positive determination (e.g., "YES") in step S34, in step S60, the CPU 32 executes a double-sided collated printing process (refer to FIG. 7). When the CPU 32 makes a negative determination (e.g., "NO") in step S34, in step S70, the CPU 32 executes a double-sided uncollated printing process (refer to FIG. 10).

In response to completion of one of steps S40, S50, S60, and S70, in step S80, the CPU 32 transmits, to the server 100, a job completion notification indicating completion of printing in accordance with the print job PJ. Thus, the completed print job PJ is erased in the server 100.

(Single-Sided Collated Printing Process)

Figure 3:
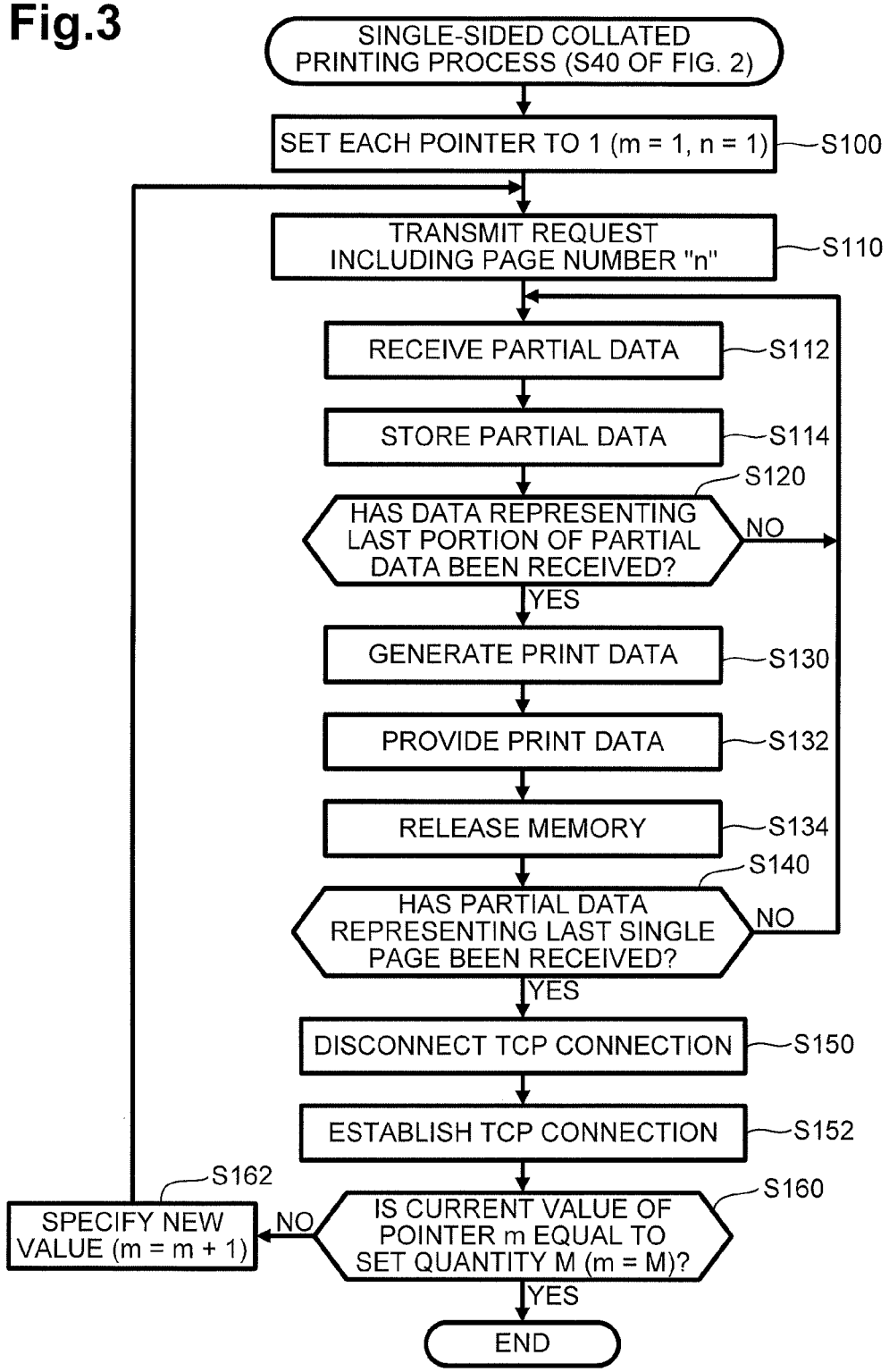
FIG. 3 is a flowchart depicting an example single-sided collated printing process in the illustrative embodiment according to one or more aspects of the disclosure.

Referring to FIG. 3, the single-sided collated printing process executed in step S2 of FIG. 2 will be described. Each communication between the printer 10 and the server 100 described below (e.g., steps S110 and S112) is performed through the TCP connection (refer to step S20 in FIG. 2 and step S152). Therefore, in the description below, the phrase "through the TCP connection" will be omitted. In the processes illustrated in FIGS. 5, 7, 10, and 11, each communication between the printer 10 and the server 100 is also performed through the TCP connection, and therefore, the phrase "through the TCP connection" will be omitted.

In step S100, the CPU 32 sets each of pointers m and n to "1 (one)". The pointer m relates to the set quantity and the printer n relates to the page number.

In step S110, the CPU 32 transmits, to the server 100, a request including a page number "n ("1" in this process)". This request may be a command for requesting the server 100 to transmit partial data representing an image of the page identified by the page number "n". In response to receipt of the request, the server 100 generates partial data (e.g. data in PWG Raster format) by converting the image file IF, and transmits data having a predetermined size and representing a portion of the partial data successively to the printer 10, beginning at data representing the first portion of the partial data. Thus, in step S112, the CPU 32 receives the partial data transmitted from the server 100, and in step S114, the CPU 32 stores the partial data in the partial data area 40.

In step S120, the CPU 32 monitors receipt of the data representing the last portion of the partial data representing a single page. A total data size of partial data is written in data representing the first portion of the partial data. The CPU 32 counts accumulated data size of the pieces of data each representing a portion of the partial data received in step S112. When the count value has not reached the total data size, the CPU 32 makes a negative determination (e.g., "NO") in step S120 and the routine returns to step S112. When the count value has reached the total data size, the CPU 32 makes a positive determination (e.g., "YES") in step S120 and the routine proceeds to step S130.

Generally, while the TCP connection is established, the server 100 transmits data to the printer 10 continuously unless the server 100 receives a halt instruction from the printer 10. For example, subsequent to transmission of partial data representing a single page to the printer 10, the server 100 transmits partial data representing another single page to the printer 10 successively. As described above, however, the partial data area 40 of the printer 10 is not capable of storing partial data representing two pages. Therefore, in response to completion of receipt of partial data representing a single page (e.g., "YES" in step S120), the CPU 32 transmits a halt instruction to the server 100 to stop subsequent data transmission from the server 100.

Nevertheless, in other embodiments, for example, in response to completion of receipt of the partial data representing a single page (e.g., "YES" in step S120), the CPU 32 may disconnect the TCP connection established between the printer 10 and the server 100. By doing so, the CPU 32 may also stop subsequent data transmission from the server 100. In this case, the CPU 32 may establish the TCP connection again between the printer 10 and the server 100 when the CPU 32 intends to receive partial data representing another single page. However, the TCP connection may be disconnected and reestablished every completion of receipt of partial data representing a single page. Therefore, a time required for receiving partial data may be elongated. As opposed to this, in the illustrative embodiment, while the TCP connection is kept established, a halt instruction is transmitted to the server 100. Therefore, the time required for receiving partial data may be shortened as compared with the configuration of other embodiments.

In step S130, the CPU 32 generates print data representing a single page (e.g., CMYK data having a relatively less tone level) in the print data area 42 by converting the partial data representing a single page (e.g., the data in PWG Raster format) stored in the partial data area 40. Nevertheless, in other embodiments, for example, the server 100 may generate print data. In this case, the CPU 32 may receive the generated print data in step S112 and may store the received print data in step S114, and step S130 may be omitted. Therefore, print data itself may be partial data.

In step S132, the CPU 32 provides the print data representing a single page stored in the print data area 42 to the print engine 18. Thus, the print engine 18 prints an image represented by the print data on one of sides of a printing sheet. In step S132, the CPU 32 also provides a discharge instruction for discharging a printing sheet, to the print engine 18. Thus, the print engine 18 discharges the printing sheet having an image representing a single page on its one of sides.

In step S134, the CPU 32 releases each of the partial data area 40 and the print data area 42 by erasing the data from each of the partial data area 40 and the print data area 42. Thus, each of the partial data area 40 and the print data area 42 becomes enabled to store new data therein. Nevertheless, data might not necessarily be erased from each of the partial data area 40 and the print data area 42. In other embodiments, for example, the CPU 32 may release each of the partial data area 40 and the print data area 42 by allowing overwriting of old data with new data in each of the partial data area 40 and the print data area 42. In still other embodiments, for example, after the CPU 32 generates print data in step S130, the CPU 32 may release the partial data area 40 before providing the print data in step S132, and may release the print data area 42 after providing the print data in step S132.

In step S140, the CPU 32 determines whether partial data representing the last single page has been received. When a string indicating the last page is written in the last portion of the partial data received in step S112, the CPU 32 makes a positive determination (e.g., "YES") in step S140 and the routine proceeds to step S150. When a string indicating the last page is not written in the last portion of the partial data received in step S112, the CPU 32 makes a negative determination (e.g., "NO") in step S140 and transmits, to the server 100, a restart instruction for restarting data transmission, and the routine returns to step S112.

Under circumstances where a positive determination (e.g., "YES") is made in step S140, N printing sheets ("N" represents the number of sheets) have been discharged. The discharged printing sheets each have, on one of sides thereof, one of images representing N ("N" is an integer of 2 or larger) pages represented by the image file IF. That is, single-sided collated printing for the first set has been completed. When the set quantity information represents multiple sets, single-sided collated printing for the second set needs to be performed subsequently. Therefore, the printer 10 needs to receive partial data representing the first page again and thus needs to request the server 100 again to transmit partial data representing the first page (e.g., step S110). In the illustrative embodiment, in order to request the server 100 to transmit partial data representing the first page to be used in single-sided collated printing for the second set, the printer 10 disconnects the TCP connection established between the printer 10 and the server 100 and then establishes the TCP connection again therebetween. Steps S150 and S152 are executed for disconnection and reestablishment of the TCP connection.

In step S150, the CPU 32 disconnects the TCP connection established between the printer 10 and the server 100 by transmitting, to the server 100, a disconnection signal for disconnecting the TCP connection therebetween. In step S152, the CPU 32 establishes the TCP connection between the printer 10 and the server 100 by transmitting again, to the server 100, a connection signal for establishing the TCP connection. Nevertheless, in other embodiments, for example, the printer 10 might not necessarily disconnect and reestablish the TCP connection (i.e., steps S150 and S152 might not necessarily be executed).

In step S160, the CPU 32 determines whether the current value of the pointer m is equal to the set quantity M represented by the set quantity information. When the current value of the pointer m is equal to the set quantity M represented by the set quantity information, the CPU 32 makes a positive determination (e.g., "YES") in step S160 and ends the single-sided collated printing process of FIG. 3. When the current value of the pointer m is smaller than the set quantity M represented by the set quantity information, the CPU 32 makes a negative determination (e.g., "NO") in step S160. In step S162, the CPU 32 specifies a new value for the pointer m by adding "1" to the current value of the pointer m, and the routine returns to step S110. Therefore, single-sided collated printing for one or more sets including the second set is performed.

(Specific Example of Single-Sided Collated Printing)

Figure 4:
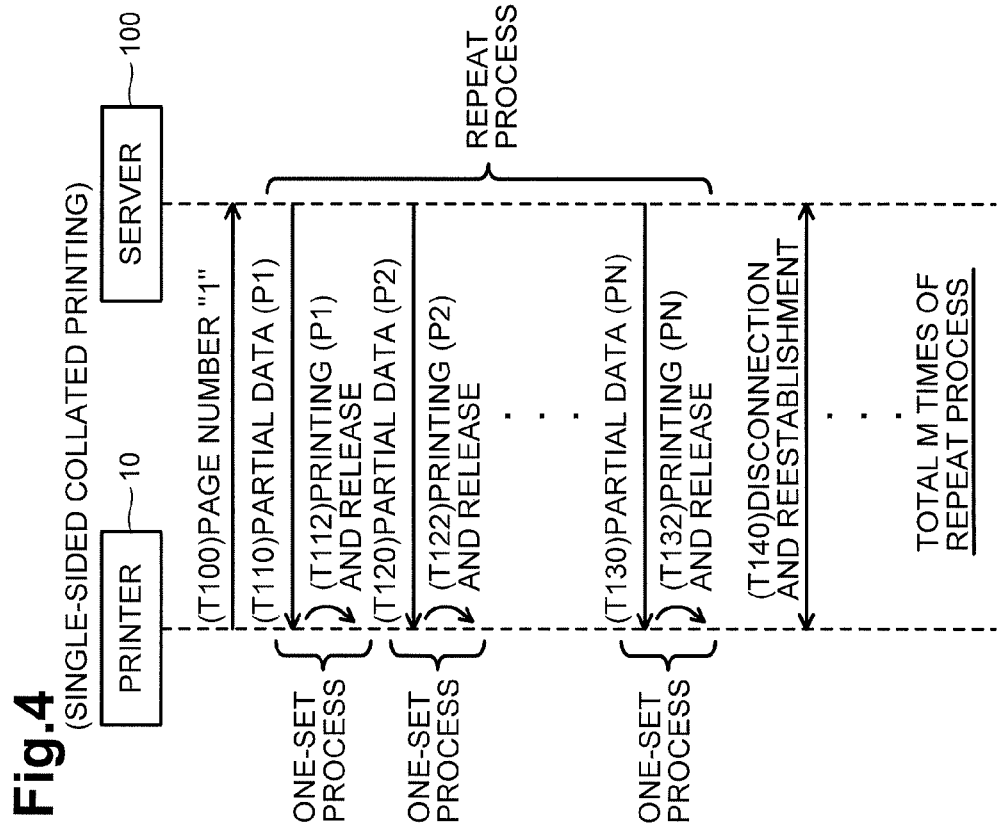
FIG. 4 illustrates a specific example of single-sided collated printing in the illustrative embodiment according to one or more aspects of the disclosure.

Referring to FIG. 4, a specific example implemented by the single-sided collated printing process of FIG. 3 will be described. Hereinafter, partial data representing the n-th page is referred to as "partial data (Pn)" and printing using the partial data representing the n-th page is referred to as "printing (Pn)". A total page (i.e., the total number of pages) included in an image file IF is indicated by "N". Hereinafter, the same expressions will be used in similar drawings. The FIG. 4 includes a table with column called "page number". The page number column indicates an order of printing. The order means a sequence of pages to be printed. FIGS. 6, 8, 9, 11, and 12 have similar page number columns.

In T100, the printer 10 transmits a request including the page number "1" to the server 100 (e.g., step S110). In T110, the printer 10 receives partial data (P1) from the server 100 (e.g., steps S112 and S114). In T112, the printer 10 performs printing (P1) (e.g., steps S130 and S132) and releases the partial data area 40 (e.g., step S134).

T110 and T112 may be a one-set process including receipt of partial data representing a single page, printing, and release of the partial data area 40. The printer 10 performs single-sided collated printing on N printing sheets ("N" represents the number of sheets) for the first set by executing a repeat process in which the one-set process is repeated until printing of all of images representing N pages is completed. That is, the printer 10 executes the one-set process including T120 and T122 for printing an image representing the second page and repeats the one-set process. The printer 10 further executes the one-set process including T130 and T132 for printing an image representing the N-th page which is the last page. Thus, one-cycle of the repeat process (e.g., T110 to T132) is completed and the single-sided collated printing on N printing sheets for one set is completed.

Upon completion of the one-cycle of the repeat process (e.g., YES in step S140), in T140, the printer 10 disconnects and reestablishes the TCP connection (e.g., steps S150 and S152). Then, the printer 10 executes the repeat process M times corresponding to the set quantity M (e.g., NO in step S160). Thus, the single-sided collated printing on (N×M) printing sheets for M sets is completed.

In FIG. 4, a table shows a correspondence between a printing sheet number and a page number representing an image to be printed on a corresponding printing sheet. The table shows the correspondence in a case where an image file IF includes images representing six pages and the images are to be printed in two sets. Tables depicted in FIGS. 6, 8, and 11 each show a similar case. An arrow appended to the table indicates an occurrence timing of disconnection and reestablishment of the TCP connection (e.g., T140). The images representing the first to sixth pages are printed on the first to sixth printing sheets and thus single-sided collated printing for the first set is completed. Then, the same images representing the first to sixth pages are printed on the seventh to twelfth printing sheets and thus single-sided collated printing for the second set is completed. Therefore, the single-sided collated printing on twelve (e.g., 6 pages×2 sets) printing sheets for two sets is completed.

If the partial data area 40 has a storage capacity capable of storing partial data representing, for example, six pages, it is unnecessary for the printer 10 to release the partial data area 40 every time printing using partial data representing a single page is performed, and the printer 10 is able to store partial data representing six pages in the partial data area 40 at once. Therefore, subsequent to completion of single-sided collated printing for the first set, the printer 10 may perform single-sided collated printing for the second set using the same partial data stored in the partial data area 40 without receiving each partial data representing a single page from the server 100. In the illustrative embodiment, however, the partial data area 40 is capable of storing only partial data representing a single page, and therefore, the above-described manner might not be adopted. Accordingly, the printer 10 implements single-sided collated printing for M sets by executing, M times, the repeat process in which the one-set process including receipt of partial data representing a single page, printing, and release of the partial data area 40 is executed. Consequently, under circumstances where the print setting information PS has been specified for the image file IF stored in the server 100, the printer 10 may perform single-sided collated printing for multiple sets appropriately using the memory 34 having a relatively small storage capacity.

(Single-Sided Uncollated Printing Process)

Figure 5:
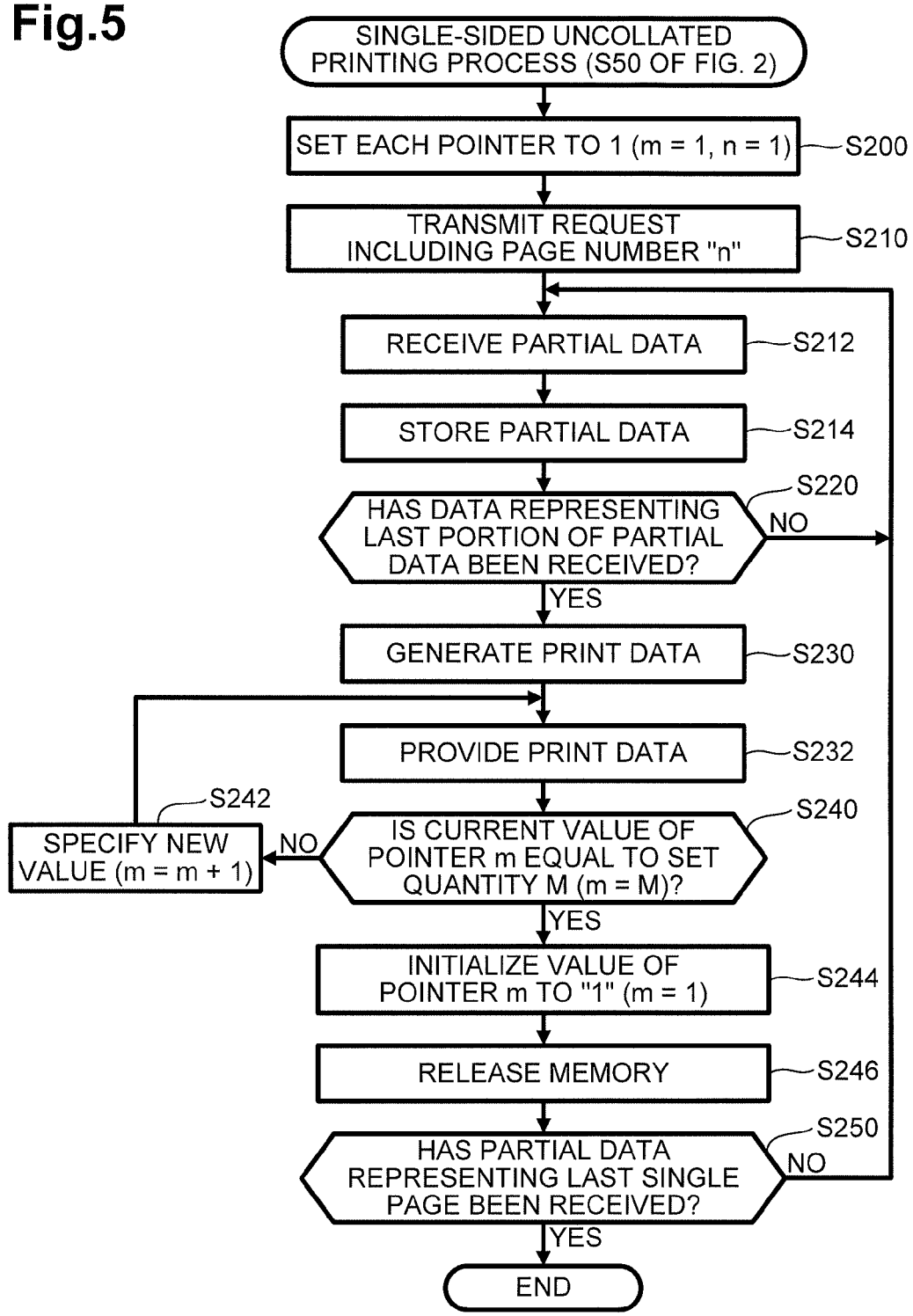
FIG. 5 is a flowchart depicting an example single-sided uncollated printing process in the illustrative embodiment according to one or more aspects of the disclosure.

Referring to FIG. 5, the single-sided uncollated printing process executed in step S50 of FIG. 2 will be described. Steps S200 to S232 are similar to steps S100 to S132, respectively, of FIG. 3.

Steps S240 and S242 are similar to steps S160 and S162, respectively, of FIG. 3. When a negative determination (e.g., "NO") is made in step S240, step S232 is executed again subsequent to step S242. That is, step S232 is repeated until printing of an image representing a single page on each of M printing sheets corresponding to the set quantity M is completed.

When a positive determination (e.g., "YES") is made in step S240, in step S244, the CPU 32 initializes the value of the pointer m to "1". In step S246, the CPU 32 releases the partial data area 40. Step S250 is similar to step S140 of FIG. 3. When a negative determination (e.g., "NO") is made in step S250, the routine goes back to step S212. When a positive determination (e.g., "YES") is made in step S250, the CPU 32 ends the single-sided uncollated printing of FIG. 5.

(Specific Example of Single-Sided Uncollated Printing)

Figure 6:
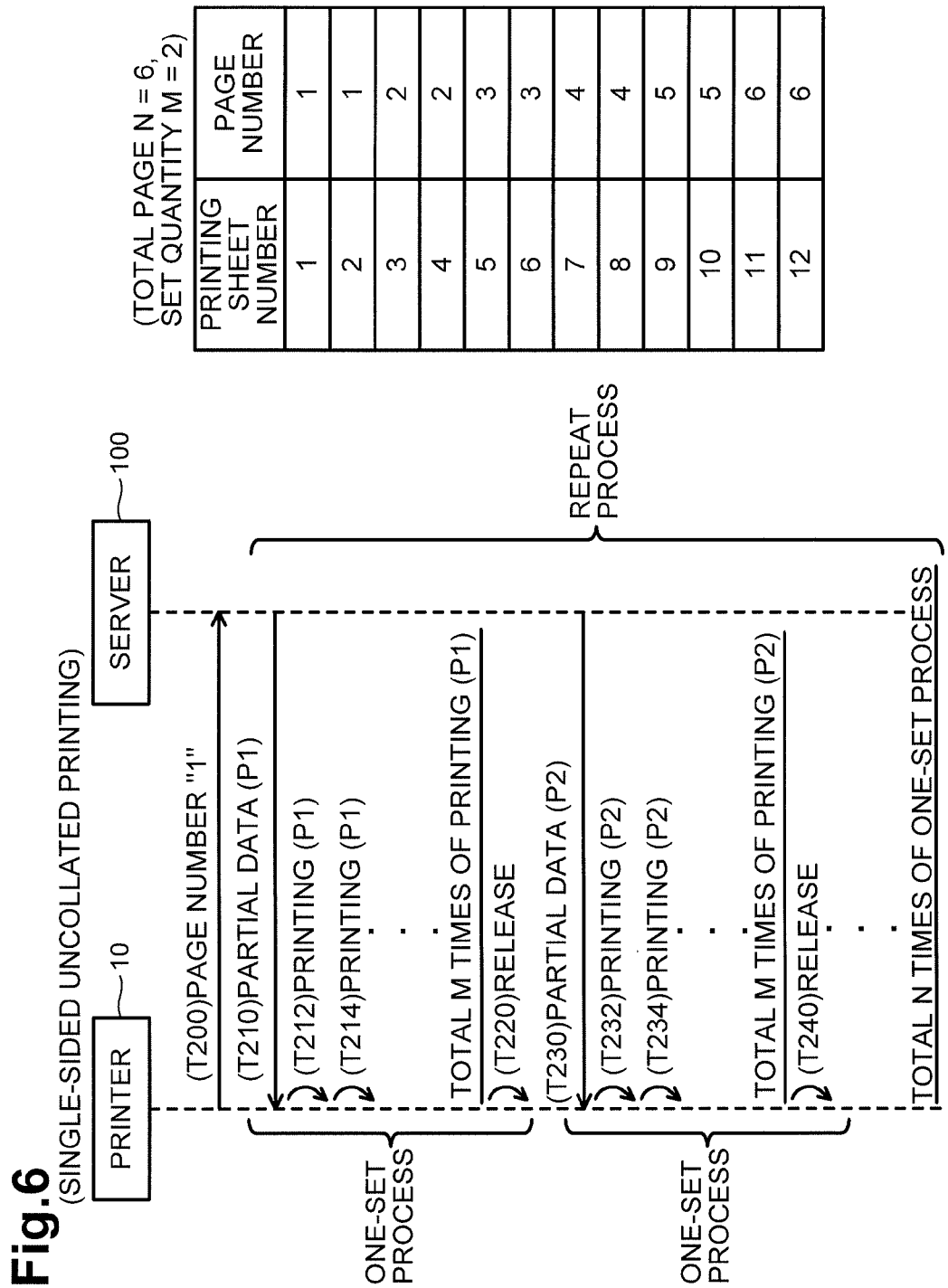
FIG. 6 illustrates a specific example of single-sided uncollated printing in the illustrative embodiment according to one or more aspects of the disclosure.

Referring to FIG. 6, a specific example implemented by the single-sided uncollated printing process of FIG. 5 will be described. In T200, the printer 10 transmits a request including the page number "1" to the server 100 (e.g., step S210). In T210, the printer 10 receives partial data (P1) from the server 100 (e.g., steps S212 and S214). In T212, the printer 10 performs printing (P1) (e.g., steps S230 and S232). The printer 10 repeats printing (P1) until printing of an image representing the first page on each of M printing sheets is completed (e.g., NO in step S240, and step S232). That is, in T214, the printer 10 performs printing (P1) again (e.g., step S232) and repeats printing (P1) M times. Then, in T220, the printer 10 releases the partial data area 40 (e.g., step S246).

T210 to T220 may be a one-set process including receipt of partial data representing a single page, M times of printing, and release of the partial data area 40. The printer 10 executes a repeat process in which the one-set process is repeated N times until printing of all of images representing N pages is completed. That is, the printer 10 executes the one-set process including T230 to T240 for printing an image representing the second page (e.g., step S212 to step S246) and further executes the one-set process for printing images representing the third page and one or more subsequent pages in a similar manner (e.g., step S212 to S246). Thus, the single-sided uncollated printing on (N×M) printing sheets for M sets is completed.

As depicted in the table of FIG. 6, an image representing the first page is printed on each of the first and second printing sheets, and an image representing the second page is printed on each of the third and fourth printing sheets. In a similar manner, the same image is printed on every successive two printing sheets repeatedly. Thus, the single-sided uncollated printing on twelve (e.g., 6 pages×2 sets) printing sheets for two sets is completed. Consequently, under circumstances where the print setting information PS has been specified for the image file IF stored in the server 100, the printer 10 may perform single-sided uncollated printing for multiple sets appropriately using the memory 34 having a relatively small storage capacity.

(Double-Sided Collated Printing Process)

Figure 7:
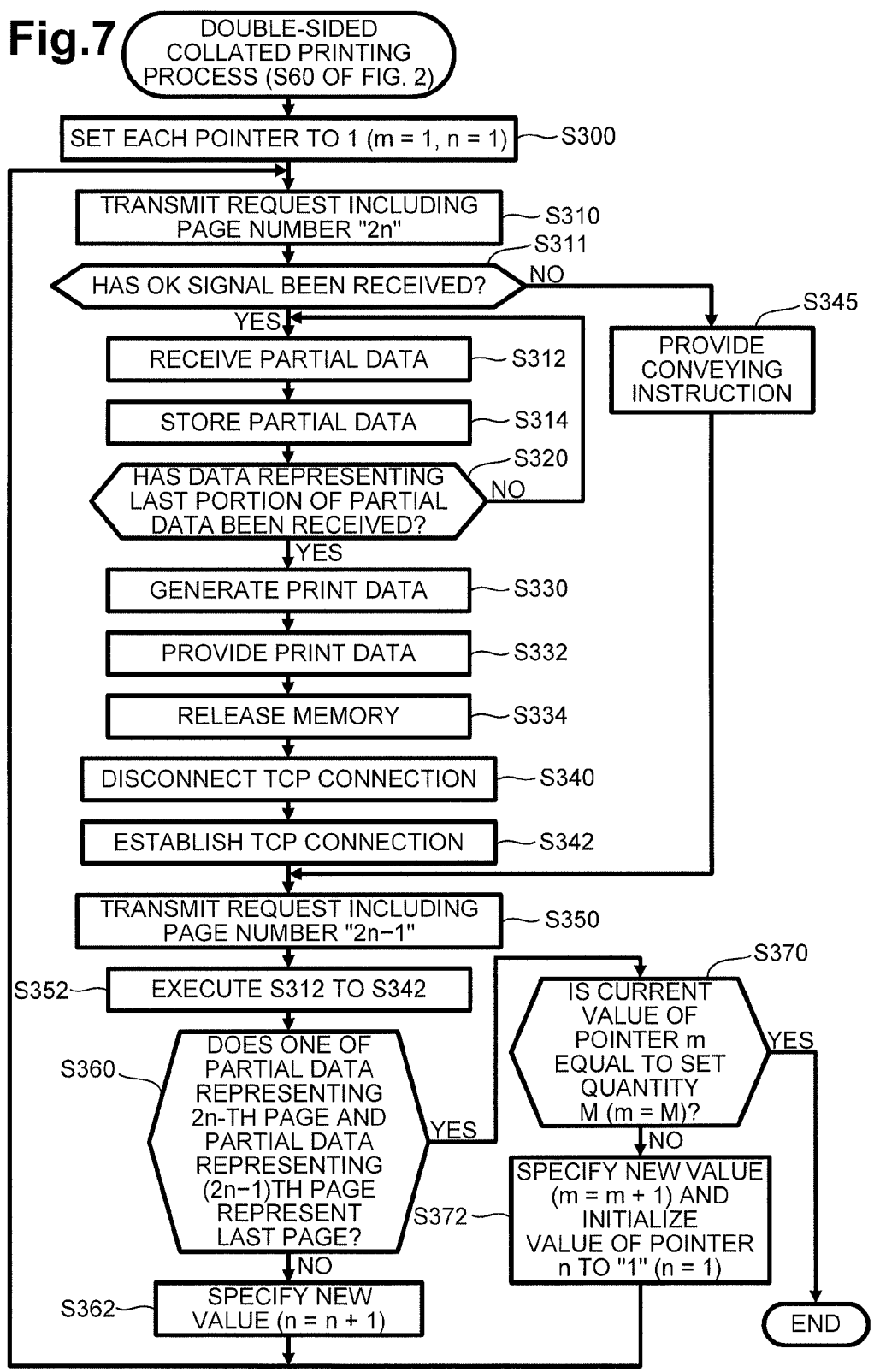
FIG. 7 is a flowchart depicting an example double-sided collated printing process in the illustrative embodiment according to one or more aspects of the disclosure.

Referring to FIG. 7, the double-sided collated printing process executed in step S60 of FIG. 2 will be described. Step S300 is similar to step S100 of FIG. 3.

As described above, the double-side printing mechanism of the print engine 18 prints an image representing the 2n-th page on a first side of a printing sheet and then prints an image representing the (2n−1)th page on a second side of a printing sheet. In order to implement such a printing manner, in step S310, the CPU 32 specifies "2n" for the page number to be requested to the server 100 and transmits a request including the specified page number "2n" to the server 100.

In step S311, the CPU 32 determines whether an OK signal has been received from the server 100 in response to the request transmitted in step S310. The OK signal may be transmitted from the server 100 in a case that the image file IF includes the page corresponding to the page number "2n" included in the request transmitted in step S310. However, assuming that n=3 and the CPU 32 transmits a request including the page number "6" to the server 100 (although the image file IF has five pages in total). In this case, the image file IF has no page corresponding the page number "6". Therefore, an NG signal is transmitted from the server 100. When an OK signal has been received from the server 100 (e.g., YES in step S311), the routine proceeds to step S312. When an NG signal has been received from the server 100 (e.g., NO in step S311), the routine proceeds to step S345.

Steps S312 to S334 are similar to steps S112 to S134, respectively, of FIG. 3. However, in step S332, the CPU 32 provides a conveying instruction to the print engine 18 instead of a discharge instruction for discharging a printing sheet. Thus, subsequent to printing of an image representing the 2n-th page on a first side of a printing sheet, the print engine 18 conveys the printing sheet to a particular position at which printing can be performed on a second side of the printing sheet from the particular position at which printing can be performed on the first side of the printing sheet.

Steps S340 and S342 are similar to steps S150 and S152, respectively, of FIG. 3. In a case that the server 100 transmits partial data representing the 2n-th page to the printer 10 in response to the request including the page number "2n", the server 10 might not be allowed to transmit partial data representing the (2n−1)th page to the printer 10 in response to a request including the page number "2n−1" until (A) the server 100 completes transmission of all partial data in an ascending order of page numbers from the 2n-th page to the last page or (B) performs disconnection and reestablishment of the TCP connection. In the former configuration, that is the case of (A), communication needs to be performed until the partial data representing the last page is transmitted, and thus, it might not be preferable, in light of prolongation of the communication duration, to adopt the former configuration. Therefore, in the illustrative embodiment, the latter configuration, that is case of (B), may be adopted and steps S340 and S342 are executed. Therefore, the printer 10 may transmit a request including the page number "2n−1" to the server 100 (e.g., step S310) to receive partial data representing the (2n−1)th page without receiving all partial data including the last page subsequent to receipt of the partial data representing the 2n-th page. Similar to this, in step S352, the printer 10 also executes steps S340 and S342. Therefore, the printer 10 may transmit a request including the page number "2n" to the server 100 (e.g., step S310) to receive partial data representing the 2n-th page without receiving all partial data including the last page. Nevertheless, in other embodiments, for example, the printer 10 may adopt the former configuration and might not execute steps S340 and S342.

In step S345, the CPU 32 provides the same conveying instruction as the conveying instruction provided in step S332 to the print engine 18 only. Therefore, the print engine 18 conveys the printing sheet from the particular position at which printing can be performed on the first side of the printing sheet to the particular position at which printing can be performed on the second side of the printing sheet, without performing printing on the first side of the printing sheet. Subsequent to step S345, the routine proceeds to step S350.

In step S350, the CPU 32 specifies "2n−1" for the page number to be requested to the server 100 and transmits a request including the specified page number "2n−1" to the server 100. In step S352, the CPU 32 executes similar processing to processing executed in steps S312 to S342. Nevertheless, in this case, in step S332, the CPU 32 provides a discharge instruction for discharging the printing sheet to the print engine 18 instead of a conveying instruction. Therefore, the print engine 18 discharges the printing sheet after printing an image representing the (2n−1)th page on a second side of the printing sheet.

In step S360, the CPU 32 determines whether one of the partial data representing the 2n-th page and the partial data representing the (2n−1)th page represents the last page. When the string indicating the last page is not written in either of the partial data representing the 2n-th page or the partial data representing the (2n−1)th page, the CPU 32 makes a negative determination (e.g., "NO") in step S360, and the routine proceeds to step S362. In step S362, the CPU 32 specifies a new value for the pointer n by adding "1" to the current value of the pointer n, and the routine returns to step S310.

When the string indicating the last page is written in one of the partial data representing the 2n-th page and the partial data representing the (2n−1)th page, the CPU 32 makes a positive determination (e.g., "YES") in step S360, and the routine proceeds to step S370. Under circumstances where a positive determination (e.g., "YES") is made in step S360, double-sided collated printing for the first set has been completed. When the current value of the pointer m is equal to the set quantity M represented by the set quantity information (e.g., YES in step S370), the CPU 32 ends the double-sided collated printing process of FIG. 7. When the current value of the pointer m is smaller than the set quantity M represented by the set quantity information (e.g., NO in step S370), in step S372, the CPU 32 specifies a new value for the pointer m by adding "1" to the current value of the pointer m and initializes the value of the pointer n to "1". Then, the routine returns to step S310. Thus, double-sided collated printing for one or more sets including the second set is performed.

(Specific Example of Double-Sided Collated Printing (Even Number of Total Pages))

Figure 8:
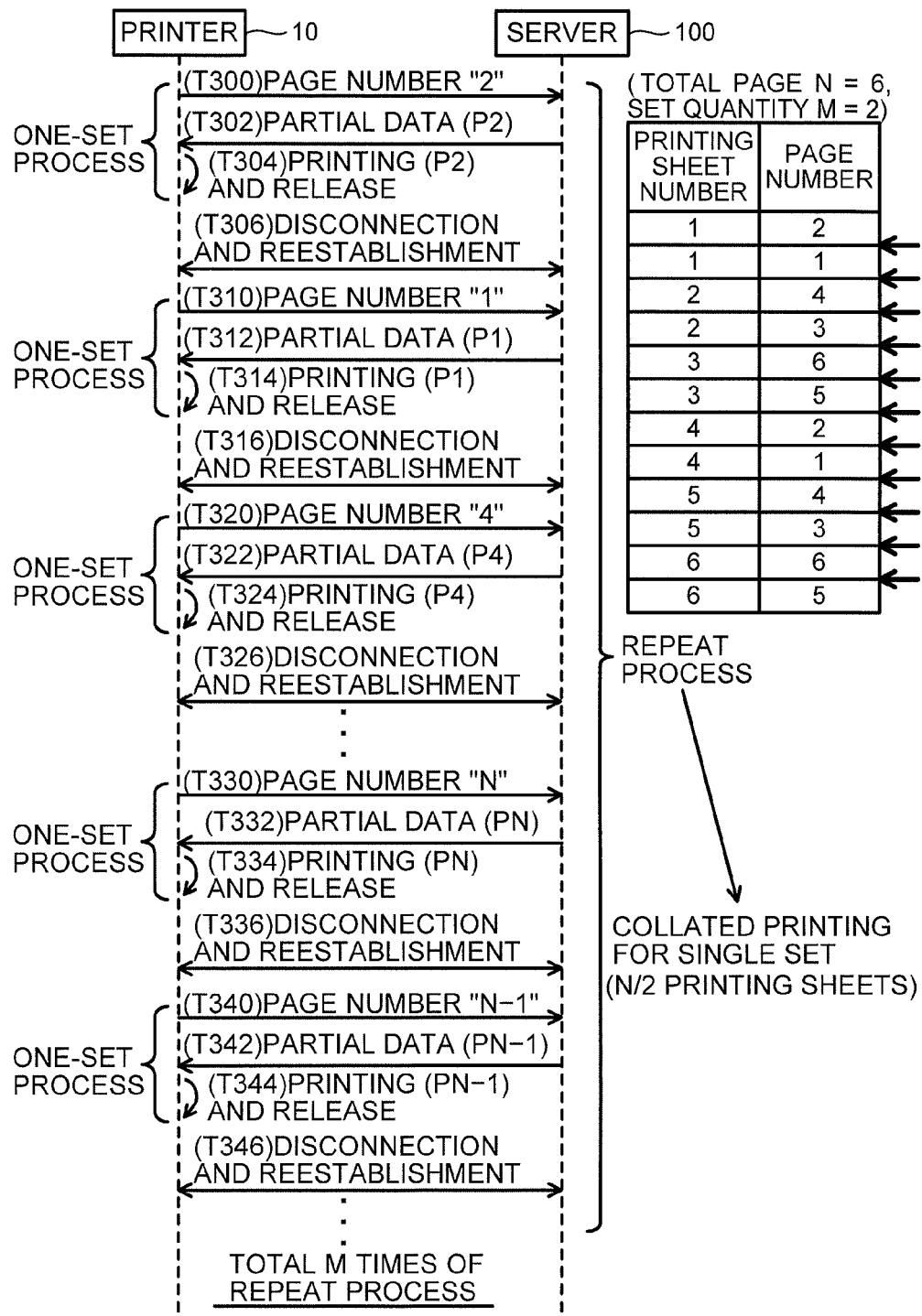
FIG. 8 illustrates a specific example of double-sided collated printing (even number of total pages) in the illustrative embodiment according to one or more aspects of the disclosure.

Referring to FIG. 8, a specific example implemented by the double-sided collated printing process of FIG. 7 will be described. FIG. 8 illustrates a case where the total number of pages of the image file IF is an even number. In T300, the printer 10 transmits a request including the page number "2" to the server 100 (e.g., step S310). In T302, the printer 10 receives partial data (P2) from the server 100 (e.g., steps S312 and S314). In T304, the printer 10 performs printing (P2) (e.g., steps S330 and S332) and releases the partial data area 40 (e.g., step S334). Then, in T306, the printer 10 disconnects and reestablishes the TCP connection with the server 100 (e.g., steps S340 and S342).

T300, T302, and T304 may be a one-set process including specification of the page number to be requested from the server 100, request of transmission of partial data representing a single page, printing, and release of the partial data area 40. The printer 10 performs double-sided collated printing on N/2 printing sheets for one set by executing a repeat process. In the repeat process, until printing of all of images representing N pages is completed, the one-set process is repeated while disconnection and reestablishment of the TCP connection with the server 100 is performed every time the one-set process is completed. That is, the printer 10 executes the one-set process including T310, T312, and T314 for printing an image representing the first page (e.g., step S350, and steps S312 to S334 included in step S352). In T316, the printer 10 disconnects and reestablishes the TCP connection with the server 100 (e.g., steps S340 and S342 included in step S352). Subsequent to this, the printer 10 executes the one-set process including T320, T32, and T324 for printing an image representing the fourth page (e.g., steps S310 to S334). In T326, the printer 10 disconnects and reestablishes the TCP connection with the server 100 (e.g., steps S340 and S342).

In a similar manner, the printer 10 executes the one-set process including T330, T332, and T334 for printing an image representing the N-th page (e.g., steps S310 to S334). In T336, the printer 10 disconnects and reestablishes the TCP connection with the server 100 (e.g., steps S340 and S342). In this one-set process, the printer 10 receives the partial data in which the string indicating the last page is written. However, the printer 10 executes, one more time, the one-set process including T340, T342, and T344 for printing an image representing the (N−1)th page (e.g., step S350, and steps S312 to S334 included in step S352). In T346, the printer 10 disconnects and reestablishes the TCP connection with the server 100 (e.g., steps S340 and S342 included in step S352). Thus, one-cycle of the repeat process (e.g., T300 to T346) is completed and the double-sided collated printing on N/2 printing sheets for one set is completed.

Upon completion of the one-cycle of the repeat process (e.g., YES in step S360), the printer 10 executes another cycle of the repeat process (e.g., NO in step S370). The printer 10 executes the repeat process M times in total. Thus, the double-sided collated printing on (N/2 (round up to the nearest whole number)×M) printing sheets for M sets is completed.

As depicted in a table in FIG. 8, the images representing the first to sixth pages are printed on the first to third printing sheets and thus the double-sided collated printing for the first set is completed. Subsequent to this, the images representing the first to sixth pages are again printed on the fourth to sixth printing sheets and thus the double-sided collated printing for the second set is completed. Therefore, the double-sided collated printing on six (e.g., 6 pages/2×2 sets) printing sheets for two sets is completed.

(Specific Example of Double-Sided Collated Printing (Odd Number of Total Pages))

Figure 9:
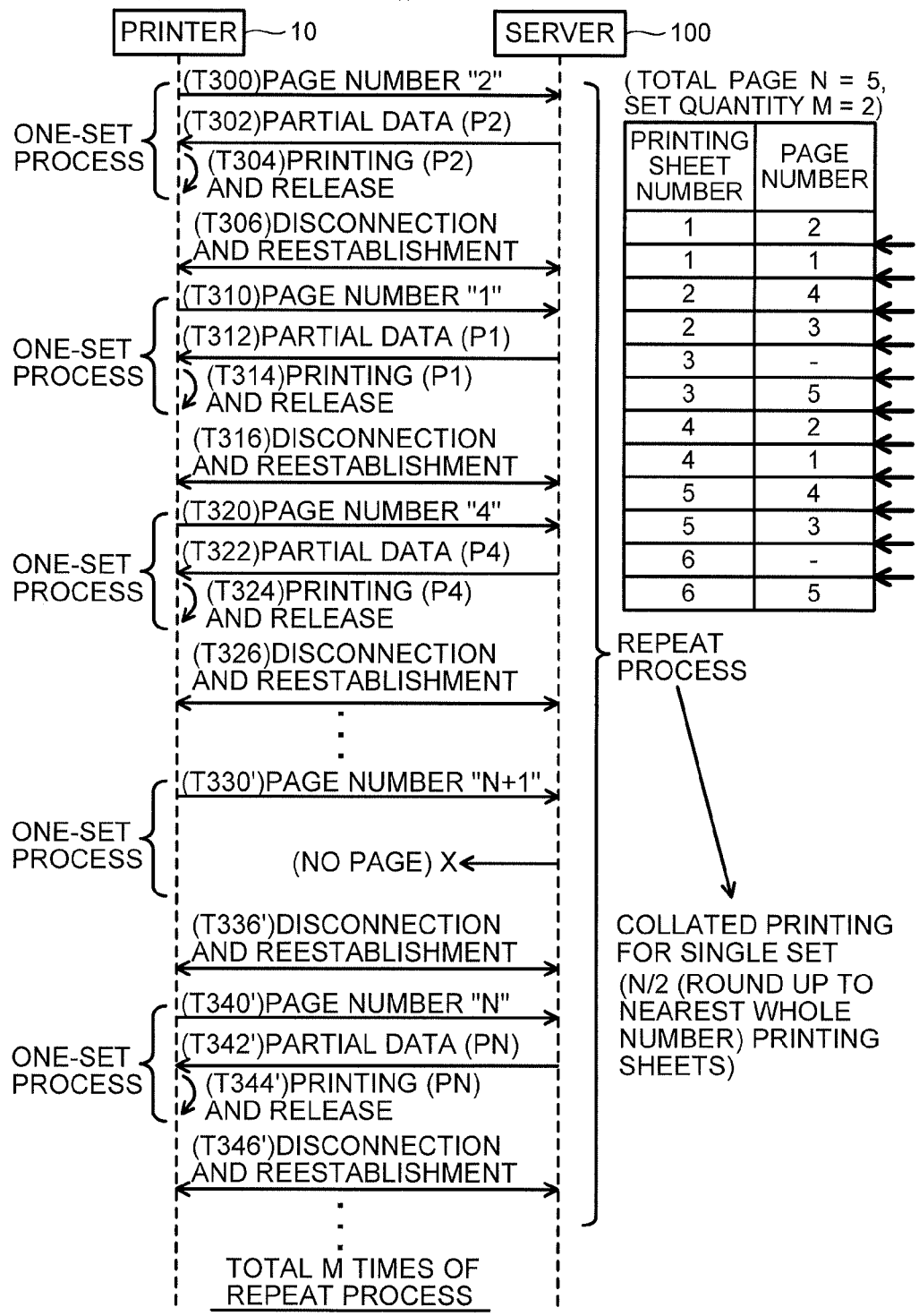
FIG. 9 illustrates a specific example of double-sided collated printing (odd number of total pages) in the illustrative embodiment according to one or more aspects of the disclosure.

FIG. 9 illustrates a case where the total number of pages of the image file IF is an odd number. T300 to T326 are similar to T300 to T326, respectively, of FIG. 8. In T330', it is assumed that the printer 10 transmits, to the server 100, a request including the page number "N+1 (e.g., 6)" that is greater than the total page of the image file IF "N (e.g., 5)" (e.g., step S310). In this case, the printer 10 receives an NG signal from the server 100 (e.g., NO in step S311), and conveys the printing sheet without performing printing (e.g., step S345). In T336', the printer 10 disconnects and reestablishes the TCP connection with the server 100 (e.g., steps S340 and S342). Subsequent to this, the printer 10 executes the one-set process including T340', T342', and T344' (e.g., step S350, and steps S312 to S334 included in step S352). In T346', the server 100 disconnects and reestablishes the TCP connection with the server 100 (e.g., steps S340 and S342 included in step S352). Thus, one-cycle of the repeat process (e.g., T300 to T346') is completed and the double-sided collated printing on N/2 (round up to the nearest whole number) printing sheets for one set is completed.

Upon completion of the one-cycle of the repeat process (e.g., YES in step S360), the printer 10 executes another cycle of the repeat process (e.g., NO in step S370). The printer 10 executes the repeat process M times. Thus, the double-sided collated printing on (N/2 (round up to the nearest whole number)×M) for M sets is completed.

In FIG. 9, a table shows a correspondence between a printing sheet number and a page number representing an image to be printed on a corresponding printing sheet. The table shows the correspondence in a case where an image file IF includes images representing five pages and the images are to be printed in two sets. The table depicted in FIG. 11 shows a similar case. As depicted in the table in FIG. 9, the images representing the first to fifth pages are printed on the first to third printing sheets and thus the double-sided collated printing for the first set is completed. Subsequent to this, the images representing the first to fifth pages are again printed on the fourth to sixth printing sheets and thus the double-sided collated printing for the second set is completed. The third and sixth printing sheets have the image representing the fifth page on their second side with having no image on their first side. Therefore, the double-sided collated printing on six (e.g., 5 pages/2 (round up to the nearest whole number)×2 sets) printing sheets for two sets is completed.

It is assumed that the printer 10 is configured to reduce a size of one partial data representing a single page and a size of another partial data representing a single page and store both the reduced data in the partial data area 40 as a piece of partial data. In this case, the printer 10 receives partial data representing the first page. In response to this, the printer 10 reduces the received partial data and stores the reduced data in the partial data area 40. Subsequent to this, the printer 10 receives partial data representing the second page. In response to this, the printer 10 reduces the received partial data and stores the reduced data in the partial data area 40. This configuration may enable for the partial data area 40 to store both the reduced data each representing a single page even when the partial data area 40 has a storage capacity for partial data representing a single page. The printer 10 performs printing on a first side of a printing sheet using the reduced data representing the second page and then performs printing on a second side of the printing sheet using the reduced data representing the first page. If this configuration is adopted, the printer 10 may receive pieces of partial data in an ascending order of page numbers. Therefore, it may be unnecessary to repeat the one-set process, and it may be also unnecessary to perform disconnection and reestablishment of the TCP connection every execution of the one-set process. Nevertheless, since the size of the partial data is reduced, quality of a printed image may be degraded. In order to avoid the degradation of the image quality, in the illustrative embodiment, the printer 10 repeats the one-set process and performs disconnection and reestablishment of the TCP connection every execution of the one-set process. Therefore, the configuration according to the illustrative embodiment might not require the size reduction of partial data, whereby the printer 10 may print a relatively high quality image. Consequently, under circumstances where the print setting information PS has been specified for the image file IF stored in the server 100, the printer 10 may perform double-sided collated printing for multiple sets appropriately using the memory 34 having a relatively small storage capacity.

(Double-Sided Uncollated Printing Process)

Figure 10:
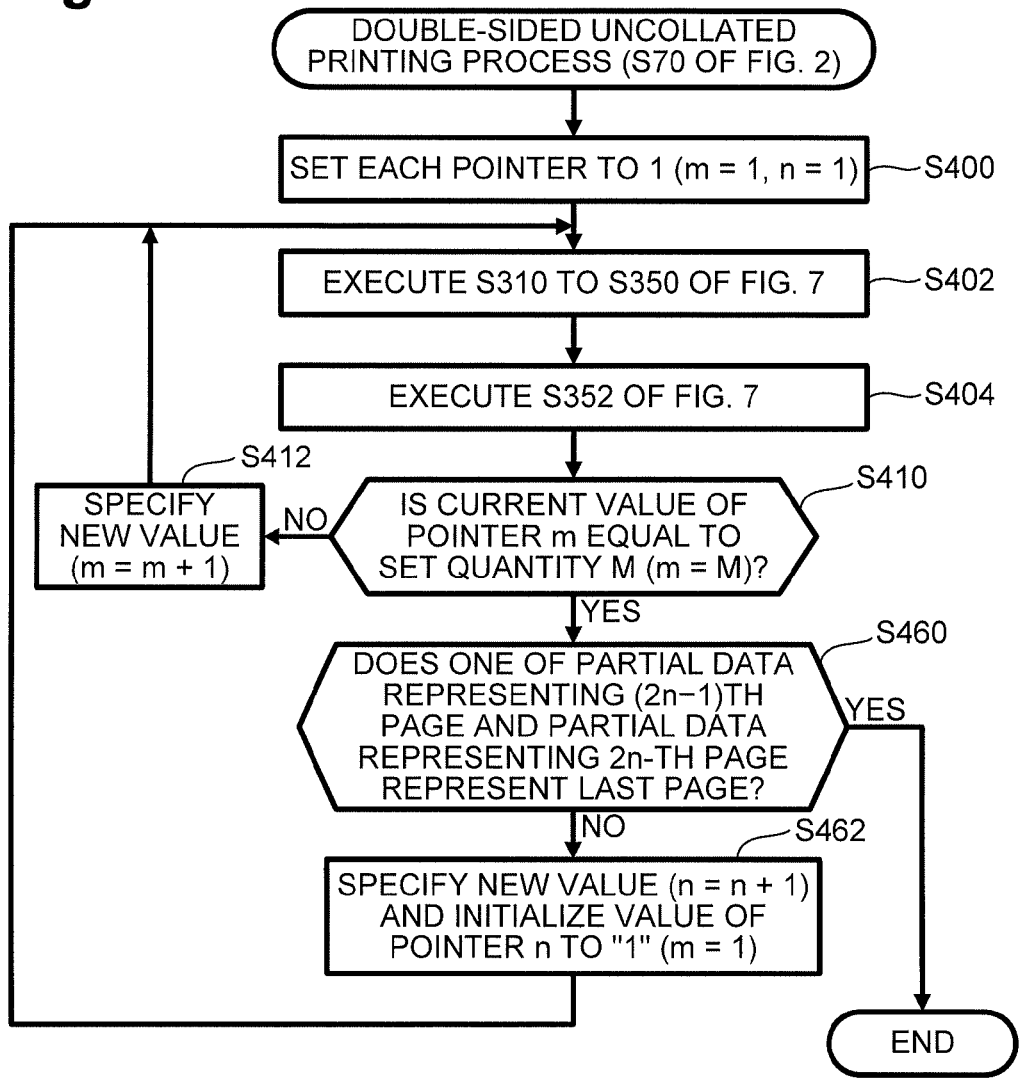
FIG. 10 is a flowchart depicting an example double-sided uncollated printing process in the illustrative embodiment according to one or more aspects of the disclosure.

Referring to FIG. 10, the double-sided uncollated printing process executed in step S70 of FIG. 2 will be described. Step S400 is similar to step S100 of FIG. 3. In step S402, the CPU 32 executes similar processing to the processing executed in steps S310 to S350 of FIG. 7. In step S404, the CPU 32 executes similar processing to the processing executed in step S352 (i.e., steps S312 to S342) of FIG. 7.

When the current value of the pointer m is smaller than the value of the set quantity M represented by the set quantity information (e.g., NO in step S410), in step S412, the CPU 32 specifies a new value for the pointer m by adding "1" to the current value of the pointer m, and the routine returns to step S402. That is, steps S402 and S404 are repeated until printing of a page set on each of M printing sheets corresponding to the set quantity M is completed. In a case that the total number of pages of an image file IF is an even number, each page set includes images representing successive two pages, and the same page set is printed on M printing sheets. A first page set including successive two pages is printed on M printing sheets. Subsequently, another page set including another successive two pages is printed on another M printing sheets. This printing manner is repeated until the last page set is printed on the last M printing sheets. In a case that the total number of pages of an image file IF is an odd number, each page set includes images representing successive two pages other than the last page set. The last page set includes an image representing a single page, i.e., the last page, only. Similar to the case where the total number of pages of the image file IF is an even number, the same page set is printed on M printing sheets. A first page set including successive two pages is printed on M printing sheets. Subsequently, another page set including another successive two pages is printed on another M printing sheets. This printing manner is repeated until the last page set is printed on the last M printing sheets.

When the current value of the pointer m is equal to the set quantity M (e.g., YES in step S410), the routine proceeds to step S460. Step S460 is similar to step S360 of FIG. 7. When the CPU 32 makes a positive determination (e.g., "YES") is in step S460, the CPU 32 ends the double-sided uncollated printing process of FIG. 10. When the CPU 32 makes a negative determination (e.g., "NO") in step S460, in step S462, the CPU 32 specifies a new value for the pointer m by adding "1" to the current value of the pointer n and initializes the value of the pointer m to "1". Then, the routine returns to step S402.

(Specific Example of Double-Sided Uncollated Printing (Even Number of Total Pages))

Referring to FIG. 11, a specific example implemented by the double-sided uncollated printing process of FIG. 10 will be described. FIG. 11 illustrates a case where the total number of pages of the image file IF is an even number. T400 to T416 are similar to T300 to T316, respectively, of FIG. 8. Through T400 to T416, printing of a first page set including images of two successive pages on a first printing sheet is completed. Subsequent to this, the printer 10 executes the one-set process including T420, T422, and T424 for printing the same page set on a second printing sheet (e.g., steps S310 to S334 included in step S402). Then, the printer 10 disconnects and reestablishes the TCP connection with the server 100 (e.g., steps S340 and S342 included in step S402). As described above, the printer 10 repeats the one-set process 2M times (e.g., T400 to T426). Thus, printing of the same page set on M printing sheets is completed.

Upon completion of the one-cycle of the repeat process (e.g., YES in step S410), the printer 10 executes another cycle of the repeat process (e.g., NO in step S460). T430 to T446 for printing the last page set including the last two successive pages are similar to T330 to T346, respectively, of FIG. 8. The printer 10 executes the repeat process N/2 times in total, and the double-sided uncollated printing on (N/2×M) printing sheets for M sets is completed.

As depicted in the table in FIG. 11, an image representing the second page is printed on a first side of each of the first and second printing sheets, and an image representing the first page is printed on a second side of each of the first and second printing sheets. An image representing the fourth page is printed on a first side of each of the third and fourth printing sheets, and an image representing the third page is printed on a second side of each of the third and fourth sheet. In a similar manner, another two images representing respective successive pages are printed on another two printing sheets. Therefore, the double-sided uncollated printing on six (e.g., 6 pages/2×2 sets) printing sheets for two sets is completed. As described above, this configuration might not require the size reduction of partial data, whereby the printer 10 may print a relatively high quality image. Consequently, under circumstances where the print setting information PS has been specified for the image file IF stored in the server 100, the printer 10 may perform double-sided uncollated printing for multiple sets appropriately using the memory 34 having a relatively small storage capacity.

(Specific Example of Double-Sided Uncollated Printing (Odd Number of Total Pages))

FIG. 12 illustrates a case where the total number of pages of the image file IF is an odd number. T400 to T426 are similar to T400 to T426, respectively, of FIG. 11. In T430', it is assumed that the printer 10 transmits, to the server 100, a request including the page number "N+1 (e.g., 6)" that is greater than the total page of the image file IF "N (e.g., 5)" (e.g., step S310 included in step S402). In this case, the printer 10 receives an NG signal from the server 100 (e.g., NO in step S311 included in step S402), and conveys the printing sheet without performing printing (e.g., step S345 included in step S402). In T436', the printer 10 disconnects and reestablishes the TCP connection with the server 100 (e.g., steps S340 and S342 included in step S402). Subsequent to this, the printer 10 executes the one-set process including T440', T442', and T444' (e.g., step S350 included in step S402, and step S312 to step S334 included in step S404). In T446', the server 100 disconnects and reestablishes the TCP connection with the server 100 (e.g., steps S340 and S342 included in step S404). That is, the printer 10 executes the repeat process N/2 (round up to the nearest whole number) times in total. Thus, the double-sided uncollated printing on (N/2 (round up to the nearest whole number)×M) printing sheets for M sets is completed.

The table illustrated in FIG. 12 is similar to the table illustrated in FIG. 11. Nevertheless, the fifth and sixth printing sheets have the image representing the fifth page on their second side with having no image printed on their first side. Thus, the double-sided uncollated printing on six (5 pages/2 (round up to the nearest whole number)×2 sets) printing sheets for two sets is completed.

(Effects Obtained by Illustrative Embodiment)

According to the illustrative embodiment, as depicted in FIGS. 8, 9, 11, and 12, in response to receipt of the print setting information PS from the server 100 (e.g., step S22 in FIG. 2), the printer 10 repeats the one-set process for printing an image representing a single page which may be part of images representing N pages, using various information (e.g., the information indicating one of double-sided printing and single-sided printing, the set quantity information, and the information indicating collated printing and uncollated printing) included in the print setting information PS. Therefore, this configuration may enable the printer 10 not to store all partial data representing N pages in the partial data area 40 at once at the time of printing the images representing N pages. Consequently, under circumstances where the print setting information PS has been specified for the image file IF stored in the server 100, the printer 10 may perform printing of the images representing N pages using the memory 34 having a relatively small storage capacity.

According to the illustrative embodiment, as depicted in FIGS. 3, 8, and 9, when the printer 10 has received the print setting information PS from the server 100 (e.g., step S22 in FIG. 2) and the print setting information PS includes the set quantity information indicating M sets which refers to multiple sets and the information indicating collated printing (e.g., YES in step S34 and YES in step S32 in FIG. 2), the printer 10 repeats the one-set process for printing an image representing a single page which may be part of images representing N pages. Therefore, this configuration may enable the printer 10 not to store all partial data representing N pages in the partial data area 40 at once at the time of performing collated printing of the images representing N pages for M sets. Consequently, under circumstances where the print setting information PS has been specified for the image file IF stored in the server 100, the printer 10 may perform printing of the images representing N pages for M sets using the memory 34 having a relatively small storage capacity.

While the disclosure has been described in detail with reference to the specific embodiment thereof, this is merely an example, and various changes, arrangements and modifications may be applied therein without departing from the spirit and scope of the disclosure. Hereinafter, variations of the illustrative embodiment will be described.

(First Variation)

In one example, the partial data area 40 may have a storage capacity for partial data representing a page less than a single page (e.g., a storage capacity for partial data representing a half page). In this case, the CPU 32 may receive partial data representing a half page successively. For example, in step S310 of FIG. 7, the CPU 32 may transmit a request requesting the page number representing the second page. In this case, in steps S312 and S314, the CPU 32 may receive and store partial data representing a first half of the second page, and in steps S330 and S332, the CPU 32 may perform printing using the partial data. In step S334, the CPU 32 may release the partial data area 40. Subsequent to this, the CPU 32 may transmit a request requesting the page number representing the second page again. In response to this, although the CPU 32 receives the partial data representing the first half of the second page again, the CPU 32 may abandon the partial data representing the first half of the second page. As opposed to this, the CPU 32 may receive and store partial data representing a second half of the second page, perform printing using the partial data representing the second half of the second page, and release the partial data area 40. In the other printing process than the printing process of FIG. 7, similar processing may be executed. In this variation example, "partial data" may represent a page or portion less than a single page. In another example, the partial data area 40 may have a storage capacity for partial data having a larger size than partial data representing a single page. In this case, "partial data" may represent an image having a larger size than an image representing a single page (e.g., "partial data" may represent an image representing two pages).

(Second Variation)

In the illustrative embodiment, in response to receipt of a request including a page number, the server 100 transmits successively, to the printer 10, partial data corresponding to the page number included in the request, and one or more subsequent partial data corresponding to one or more subsequent page numbers. Nevertheless, in a variation, for example, in response to receipt of a request including a page number, the server 100 may transmit, to the printer 10, only partial data corresponding to the page number included in the request. In this case, for example, this configuration may enable the CPU 32 not to detect the last portion of the partial data in step S120 of FIG. 3. When the CPU 32 makes a negative determination (e.g., "NO") in step S140 of FIG. 3, the CPU 32 may transmit another request including the next page number to the server 100, and the routine proceeds to step S112. In this variation, the CPU 32 might not necessarily execute, for example, steps S340 and S342 of FIG. 7.

(Third Variation)

For example, in step S310 of FIG. 7 and similar steps, instead of transmitting a request including a page number to the server 100, the CPU 32 may transmit, to the server 100, a request including information indicating a data start position of partial data identified by the page number (e.g., the number of bytes from the top of the image file IF). In this variation, the information indicating the data start position is an example of "identification information".

(Fourth Variation)

The print setting information PS may further include other information, for example, descending order printing information indicating execution of descending order printing, and range information indicating a print page range. In this case, for example, in step S310 of FIG. 7 and similar steps, the CPU 32 may specify a page number to be requested to the server 100 in accordance with the descending order printing information and the range information. In this variation, each of the descending order printing information and the range information is an example of "order information".

(Fifth Variation)

In the illustrative embodiment, in double-sided collated printing, the print engine 18 prints an image representing the second page on a first side of the first printing sheet, an image representing the first page on a second side of the first printing sheet, an image representing the fourth page on a first side of the second printing sheet, and an image representing the third page on a second side of the second printing sheet in this order. Nevertheless, in one example of a fifth variation, the print engine 18 may perform printing in another order. For example, the print engine 18 may print an image representing the second page on a first side of the first printing sheet, an image representing the fourth page on a first side of the second printing sheet, an image representing the first page on a second side of the first printing sheet, and an image representing the third page on a second side of the second printing sheet in this order. That is, in the double-sided collated printing, the printer 10 may receive pieces of partial data representing respective pages in the order which is the second page, the fourth page, the first page, the third page, and . . . . In another example, the print engine 18 may print an image representing the first page on a first side of the first printing sheet, an image representing the second page on a second side of the first printing sheet, an image representing the third page on a first side of the second printing sheet, and an image representing the fourth page on a second side of the second printing sheet in this order. That is, in double-sided collated printing, the printer 10 may receive pieces of partial data representing respective pages in the order which is the first page, the second page, the third page, the fourth page, and . . . . That is, in a "specifying process", the specification order of the identification information may be different from the order used in the illustrative embodiment.

(Sixth Variation)

Before executing the printing process of FIG. 7, the CPU 32 may determine the order of page numbers to be requested. After determining, the CPU 32 sends to the server a request with the order of page numbers. For example, in the table illustrated in FIG. 8, the CPU 32 may determine the requesting order which is, for example, 2, 1, 4, 3, and . . . . Instead of using the pointers m and n, the CPU 32 may specify the page number to be requested, in accordance with the determined requesting order, every time the CPU 32 transmits a request to the server 100. Specifying the page number in accordance with the determined order is another example of the "specifying process".

(Seventh Variation)

For example, in step S320 of FIG. 7 and similar steps, the CPU 32 may monitor a timing at which the amount of data stored in the partial data area 40 reaches a threshold (e.g., at timing at which a state of the partial data area 40 changes to a memory full state). When the state of the partial data area 40 has changed to the memory full state, the CPU 32 may make a positive determination (e.g., "YES") in step S320. That is, "monitoring receipt of page end data" might not necessarily be executed.

(Eighth Variation)

Release of the partial data area 40 and the print data area 42 of the memory 34 (e.g., step S134 of FIG. 3, step S246 of FIG. 5, and step S334 of FIG. 7) may be executed as described below. Each of the partial data area 40 and the print data area 42 may be allowed to overwrite data therein at all times. The CPU 32 may release the partial data area 40 by receiving partial data and storing the partial data in the partial data area 40 (e.g., step S314 of FIG. 7). That is, in the eighth variation, a "releasing process" for partial data representing a page and a "storing process" for partial data representing a subsequent page may be executed simultaneously.

(Ninth Variation)

In one example, the printer 10 may be capable of performing collated printing only, that is, the printer 10 may be incapable of performing uncollated printing. In another example, the printer 10 may be capable of performing uncollated printing only, that is, the printer 10 may be incapable of performing collated printing. In whichever example above, the print setting information PS might not necessarily include information indicating one of collated printing and uncollated printing. In still another example, the printer 10 may be capable of performing single-sided printing only, that is, the printer 10 may be incapable of performing double-sided printing. In this case, the print setting information PS might not necessarily include information indicating one of double-sided printing and single-sided printing. In yet another example, when "face-up" is specified for the sheet discharge manner of the printer 10, the printer 10 may request transmission of multiple pieces of partial data representing respective pages in descending order of page numbers. When "face-down" is specified for the sheet discharge manner of the printer 10, the printer 10 may request transmission of multiple pieces of partial data representing respective pages in ascending order of page numbers. "Face-up" may refer to that a printing sheet is discharged with its printed side facing upward. "Face-down" may refer to that a printing sheet is discharged with its printed side facing downward. As described above, the printer 10 may be capable of determining the page number to be requested, in accordance with the sheet discharge manner. Therefore, the print setting information PS might not necessarily include information indicating one of the ascending order and the descending order. As described above, the print setting information PS might not necessarily include information indicating one of collated printing and uncollated printing, information indicating one of double-sided printing and single-sided printing, nor information indicating one of the ascending order and the descending order. Generally, the "print setting information" might not necessarily include the order information.

(Tenth Variation)

In one example, the user might not be able to specify the set quantity at the time an image file IF is submitted to the server 100. In this case, the print setting information PS might not necessarily include set quantity information, and the printer 10 may print one set only. In another example, the user may be able to specify the set quantity at the time an image file IF is submitted to the server 100. In a case that the user specifies the set quantity indicating multiple sets, the print setting information PS may include set quantity information. In a case that the user specifies the set quantity indicating a single set, the print setting information PS might not include set quantity information.

(Eleventh Variation)

In the illustrative embodiment, the processes of each of FIGS. 2 to 12 are implemented by the CPU 32 of the printer 10, which executes the program 36 stored in the memory 34. Nevertheless, in an eleventh variation, for example, at least one of the processes of FIGS. 2 to 12 may be implemented by other hardware (e.g., a logic circuit).

Further, the technical elements described in the specification and the drawings exhibit technical usability alone or in various combinations, and are not limited to those in the claims at the time of the filing of the disclosure. Furthermore, the techniques described as examples in the specification or drawings may achieve a plurality of objects simultaneously, and have technical utility by achieving any one of these objects.

What is claimed is:

1. A printer comprising:
   a communication interface;
   a print engine; and
   a controller comprising:
     a processor; and
     a memory storing computer-readable instructions, the computer-readable instructions, when executed by the processor, causing the printer to perform:
       in a receiving process, receiving from a server, via the communication interface, print setting information, wherein the server stores therein a file representing page images representing N pages (N is an integer of 2 or larger) and the print setting information in association with each other, wherein the print setting information includes order information relating to a printing order of the page images; and
       in response to receipt of the print setting information from the server, in a repeat process, repeating a one-set process, the one-set process comprising:
         in a specifying process, specifying, in accordance with the order information, identification information that identifies partial data to be received from the server, wherein the partial data represents a partial image which is part of the page images representing N pages;
         in a transmitting process, transmitting a request including the specified identification information to the server via the communication interface;
         in response to receipt from the server via the communication interface of the partial data identified by the identification information included in the request, in a storing process, storing the partial data in the memory;
         in a printing process, causing the print engine to perform printing of the partial image represented by the partial data using the partial data stored in the memory; and
         subsequent to the printing process, in a releasing process, releasing in the memory a particular area storing the partial data.

2. The printer according to claim 1, wherein the partial data represents a page image representing a single page which is included in the page images representing N pages, and
wherein the identification information includes a page number that identifies the page image representing a single page.

3. The printer according to claim 2, wherein the order information includes set quantity information indicating M sets (M is an integer of 2 or larger), and printing type information related to a printing type selected from a plurality of printing types,
   wherein the computer-readable instructions, when executed by the processor, further cause the printer to perform:
   determining the printing type included in the printing type information, wherein the printing type includes one of a collated printing for a double-sided printing and an uncollated printing for the double-sided printing,
   wherein in a case where the determined printing type is the collated printing for a double-sided printing, in the transmitting process for a front side of a particular printing sheet number, transmitting a request including the specified identification information, which identifies a first page number, to the server via the communication interface,
   wherein in a case where the determined printing type is the uncollated printing for the double-sided printing, in the transmitting process for the front side of the particular printing sheet number, transmitting a request including the specified identification information, which identifies a second page number different from the first page number, to the server via the communication interface.

4. The printer according to claim 3,
   wherein in a case where the determined printing type is the collated printing for a double-sided printing, in the transmitting process for a back side being opposite to the front side of a precedent printing sheet number being immediately prior to the particular printing sheet number, transmitting a request including the specified identification information, which identifies a third page number, to the server via the communication interface,
   wherein in a case where the determined printing type is the uncollated printing for a double-sided printing, in the transmitting process for the back side of the precedent printing sheet number, transmitting a request including the specified identification information, which identifies the third page number, to the server via the communication interface.

5. The printer according to claim 2, wherein the order information includes set quantity information indicating M sets (M is an integer of 2 or larger), and printing type information related to a printing type selected from a plurality of printing types,
   wherein the computer-readable instructions, when executed by the processor, further cause the printer to perform:
   determining the printing type included in the printing type information, wherein the printing type includes one of a collated printing for a single-sided printing and an uncollated printing for the single-sided printing,
   wherein in a case where the determined printing type is the collated printing for a single-sided printing, in the transmitting process for a particular printing sheet number, transmitting a request including the specified identification information, which identifies a first page number, to the server via the communication interface,
   wherein in a case where the determined printing type is the uncollated printing for the single-sided printing, in the transmitting process for the particular printing sheet number, transmitting a request including the specified identification information, which identifies a second page number different form the first page number, to the server via the communication interface.

6. The printer according to claim 5,
wherein in a case where the determined printing type is the collated printing for a single-sided printing, in the transmitting process for a first printing sheet number being the number of sheet printed for the first time, transmitting a request including the specified identification information, which identifies a third page number, to the server via the communication interface,
wherein in a case where the determined printing type is the uncollated printing for a single-sided printing, in the transmitting process for the first printing sheet number, transmitting a request including the specified identification information, which identifies the third page number, to the server via the communication interface.

7. The printer according to claim 2, wherein, in a case that the order information includes double-sided printing information indicating execution of double-sided printing:
the computer-readable instructions, when executed by the processor, further cause the printer to perform:
in the transmitting process of the j-th (j is an integer of 1 or larger) time, transmitting the request including a page number indicating the n-th page (n is an integer of 1 or larger); and
in the transmitting process of the (j+1)th time, transmitting, to the server, the request including another page number that is different from the page number indicating the (n+1)th page.

8. The printer according to claim 7, wherein:
the computer-readable instructions, when executed by the processor, further cause the printer to perform:
in an establishing process, establishing a connection with the server via the communication interface;
in a monitoring process, monitoring receipt of page end data representing an end of the page image representing the n-th page from the server via the communication interface in response to execution of the transmitting process of the j-th time through the connection with the server;
in response to receipt of the page end data, in a disconnecting process, disconnecting the connection established with the server;
subsequent to the disconnecting process, executing the establishing process to reestablish the connection with the server via the communication interface; and
executing the transmitting process of the j-th time through the reestablished connection.

9. The printer according to claim 8, wherein the connection established with the server is in compliance with a Transmission Control Protocol.

10. The printer according to claim 7, wherein, in a first case in which the N indicates an even number, and in the transmitting process of the j-th time, file end data representing an end of the file is received via the communication interface in response to the transmission of the request including the n-th page number representing the N-th page to the server:
the computer-readable instructions, when executed by the processor, further cause the printer to perform:
in the transmitting process of the (j+1)th time, transmitting, to the server, the request including the page number that is different from the page number indicating the (n+1)th page.

11. The printer according to claim 10, wherein, in the first case, the page number that is different from the page number indicating the (n+1)th page is a page number indicating the (N−1)th page.

12. The printer according to claim 7, wherein, in a second case in which the N indicates odd number, and in the transmitting process of the j-th time, the partial data is incapable of being received in response to the transmission of the request including the n-th page number representing the (N+1)th page to the server:
the computer-readable instructions, when executed by the processor, further cause the printer to perform:
in the transmitting process of the (j+1)th time, transmitting, to the server, the request including the page number that is different from the page number indicating the (n+1)th page.

13. The printer according to claim 12, wherein:
the computer-readable instructions, when executed by the processor, further cause the printer to perform, in the second case, in a conveying process, causing the print engine to convey a recording medium, without causing the print engine to perform printing on a first side of the recording medium, from a position at which printing can be performed on the first side of the recording medium to another position at which printing can be performed on a second side of the recording medium.

14. The printer according to claim 12, wherein, in the second case, the page number that is different from the page number indicating the (n+1)th page is a page number indicating the N-th page.

15. The printer according to claim 1, wherein, in a case that the order information includes double-sided printing information indicating execution of double-sided printing, set quantity information indicating M sets (M is an integer of 2 or larger), and collated printing information indicating execution of collated printing:
the computer-readable instructions, when executed by the processor, further cause the printer to perform:
in the repeat process, executing collated printing for a single set on N/2 ((N/2 being rounded up to the nearest whole number) recording media by repeating the one-set process until all of the page images representing N pages is printed, and
executing collated printing for M sets by executing the repeat process M times.

16. The printer according to claim 1, wherein, in a case that the order information includes double-sided printing information indicating execution of double-sided printing, set quantity information indicating M sets (M is an integer of 2 or larger), and uncollated printing information indicating execution of uncollated printing:
the computer-readable instructions, when executed by the processor, further cause the printer to perform:
in the repeat process, repeating the one-set process until a page set on M recording media is printed, and
executing uncollated printing for M sets by executing the repeat process until all of the page images representing N pages is printed.

17. A printer comprising:
a communication interface;
a print engine; and
a controller comprising:
a processor; and
a memory storing computer-readable instructions, the computer-readable instructions, when executed by the processor, causing the printer to perform:

in a receiving process, receiving from a server, via the communication interface, print setting information wherein the server stores therein a file representing page images representing N pages (N is an integer of 2 or larger) and the print setting information in association with each other; and in a first case in which the print setting information includes set quantity information indicating M sets, in a first repeat process, executing collated printing for a single set by repeating a first one-set process until all of the page images representing N pages is printed, the first one-set process comprising:

in response to receipt from the server via the communication interface of partial data representing a partial image which is part of the page images representing N pages, in a storing process, storing the partial data in the memory;

in a first printing process, causing the print engine to perform printing of the partial image represented by the partial data using the partial data stored in the memory;

subsequent to the first printing process, in a first releasing process, releasing in the memory a particular area storing the partial data, in the first case, executing collated printing for the M sets by executing the first repeat process M times.

18. The printer according to claim 17, wherein the print setting information includes printing type information related to a printing type selected from a plurality of printing types, wherein the computer-readable instructions, when executed by the processor, further cause the printer to perform:

determining the printing type included in the printing type information, wherein the printing type includes one of a collated printing and an uncollated printing, the printing type further includes one of single-sided printing and double-sided printing, wherein in the first case in which the determined print type is first printing type indicating the collated printing by the print setting information including set quantity information indicating M sets, the first repeat process is executed, and wherein in a case being different from the first case in which the determined printing type is second printing type not indicating the collated printing, the first repeat process is not executed.

19. The printer according to claim 17, wherein:
the computer-readable instructions, when executed by the processor, further cause the printer to perform:
in the first case, in a case that the print setting information includes double-sided printing information indicating execution of double-sided printing and collated printing information indicating execution of collated printing,
in the first repeat process, executing double-sided collated printing for a single set on N/2 (N/2 being rounded up to the nearest whole number) recording media by repeating the first one-set process until all of the page images representing N pages is printed,
in a second case in which the print setting information includes the double-sided printing information, the set quantity information indicating M sets, and uncollated information indicating execution of uncollated printing, in a second repeat process, repeating the first one-set process until a page set is printed on M recording media,
in the second case, executing double-sided uncollated printing for M sets by executing the second repeat process N/2 (N/2 being rounded up to the nearest whole number) times until all of the page images representing N pages is printed.

20. The printer according to claim 19, wherein in the first case, in a case that the print setting information includes single-sided printing information indicating execution of single-sided printing and the collated printing information,
the computer-readable instructions, when executed by the processor, further cause the printer to perform:
in the first repeat process, executing single-sided collated printing for a single set on N recording media by repeating the first one-set process until all of the page images representing N pages is printed.

21. The printer according to claim 20, wherein:
the computer-readable instructions, when executed by the processor, further cause the printer to perform:
in an establishing process, establishing a connection with the server via the communication interface;
in the first case, in a case that the print setting information further includes the single-sided printing information and the collocated printing information,
subsequent to execution of the first repeat process one time through the connection with the server, in a disconnecting process, disconnecting the connection established with the server;
subsequent to the disconnecting process, executing the establishing process to reestablish the connection with the server via the communication interface;
executing the first repeat process another one time through the reestablished connection.

22. The printer according to claim 19, wherein:
the computer-readable instructions, when executed by the processor, further cause the printer to perform:
in a third case in which the print setting information includes single-sided printing information indicating execution of single-sided printing information, the set quantity information indicating M sets, and the uncollated information,
in a third repeat process, repeating a second one-set process, the second one-set process including:
the storing process; and
in a second printing process, causing the print engine to perform printing of a page set on M recording media using the partial data stored in the memory; and
subsequent to the second printing process, in a second releasing process, releasing the particular area storing the partial data in the memory, and
executing single-sided uncollated printing for M sets by executing the third repeat process in which the second one-set process is repeated N times until all of the page images representing N pages.

23. A non-transitory computer-readable recording medium storing computer-readable instructions, the computer-readable instructions, when executed by a processor of a printer, causing the printer to perform:
receiving from a server, via a communication interface, print setting information, wherein the server stores therein a file representing page images representing N pages (N is an integer of 2 or larger) and the print setting information in association with each other, wherein the print setting information includes order information relating to a printing order of the page images; and in response to receipt of the print setting information from the server, repeating a one-set process, the one-set process comprising:

specifying, in accordance with the order information, identification information that identifies partial data to be received from the server, wherein the partial data represents a partial image which is part of the page images representing N pages;

transmitting a request including the specified identification information to the server via the communication interface;

in response to receipt from the server via the communication interface of the partial data identified by the identification information included in the request, storing the partial data in the memory;

causing a print engine to perform printing of the partial image represented by the partial data using the partial data stored in the memory; and subsequent to causing the print engine to perform printing of the partial image, releasing in the memory a particular area storing the partial data.

24. A non-transitory computer-readable recording medium storing computer-readable instructions, the computer-readable instructions, when executed by a processor of a printer, causing the printer to perform:

receiving from a server, via a communication interface, print setting information, wherein the server stores therein a file representing page images representing N pages (N is an integer of 2 or larger) and the print setting information in association with each other; and in a first case in which the print setting information includes set quantity information indicating M sets, executing collated printing for a single set by repeating a first one-set process until all of the page images representing N pages is printed, the first one-set process comprising:

in response to receipt from the server via the communication interface of partial data representing a partial image which is part of the page images representing N pages, storing the partial data in the memory;

causing a print engine to perform printing of the partial image represented by the partial data using the partial data stored in the memory;

subsequent to causing the print engine to perform printing of the partial image represented by the partial data, releasing in the memory a particular area storing the partial data, in the first case, executing collated printing for the M sets by executing the first repeat process M times.

* * * * *